United States Patent
Bossemeyer, Jr. et al.

(10) Patent No.: US 8,630,302 B2
(45) Date of Patent: *Jan. 14, 2014

(54) SYSTEM AND NETWORK FOR DERIVING VOICE CHANNELS ON A BROADBAND COMMUNICATION LINE

(75) Inventors: Robert Wesley Bossemeyer, Jr., St. Charles, IL (US); Dale Brian Halling, Colorado Springs, CO (US); Scott Christopher Goering, Naperville, IL (US); Michael George Gorman, Schaumburg, IL (US); Denise Violetta Kagan, Riverwoods, IL (US); Jeffrey Neumann, Hoffman Estates, IL (US); Michael Steven Pickard, Highland Park, IL (US); Michael Tisiker, Westland, MI (US); Bruce Edward Stuckman, Algonquin, IL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/544,077

(22) Filed: Jul. 9, 2012

(65) Prior Publication Data
US 2012/0294303 A1   Nov. 22, 2012

Related U.S. Application Data

(63) Continuation of application No. 12/424,303, filed on Apr. 15, 2009, now Pat. No. 8,238,354, which is a continuation of application No. 11/670,162, filed on Feb. 1, 2007, now Pat. No. 7,525,990, which is a continuation of application No. 10/679,197, filed on Oct. 2, 2003, now abandoned, which is a continuation of application No. 09/836,000, filed on Apr. 16, 2001, now abandoned, which is a continuation of application No. 09/296,954, filed on Apr. 22, 1999, now Pat. No. 6,335,936.

(51) Int. Cl.
*H04L 12/28* (2006.01)

(52) U.S. Cl.
USPC ......... 370/401; 370/395.1; 370/468; 370/352

(58) Field of Classification Search
None
See application file for complete search history.

(56) References Cited

U.S. PATENT DOCUMENTS 6,728,238 B1 * 4/2004 Long et al. ............... 370/352
6,868,060 B2 * 3/2005 Barzegar et al. .......... 370/228

* cited by examiner

*Primary Examiner* — Duc C Ho
(74) *Attorney, Agent, or Firm* — Garlick & Markison; Bruce E. Stuckman

(57) ABSTRACT

A communications network is disclosed and includes a broadband communication line having a first derived voice channel and a second derived voice channel, wherein the first and second derived voice channels are established as a function of an available bandwidth associated with the broadband communication line. The communication network further includes a residential gateway in communication with the broadband communication line. The residential gateway includes a switch, a network interface device in communication with the switch, and wherein the switch is configured to select at least one of the first or second derived voice channels for voice communication over the broadband communication line as a function of the available bandwidth.

18 Claims, 21 Drawing Sheets

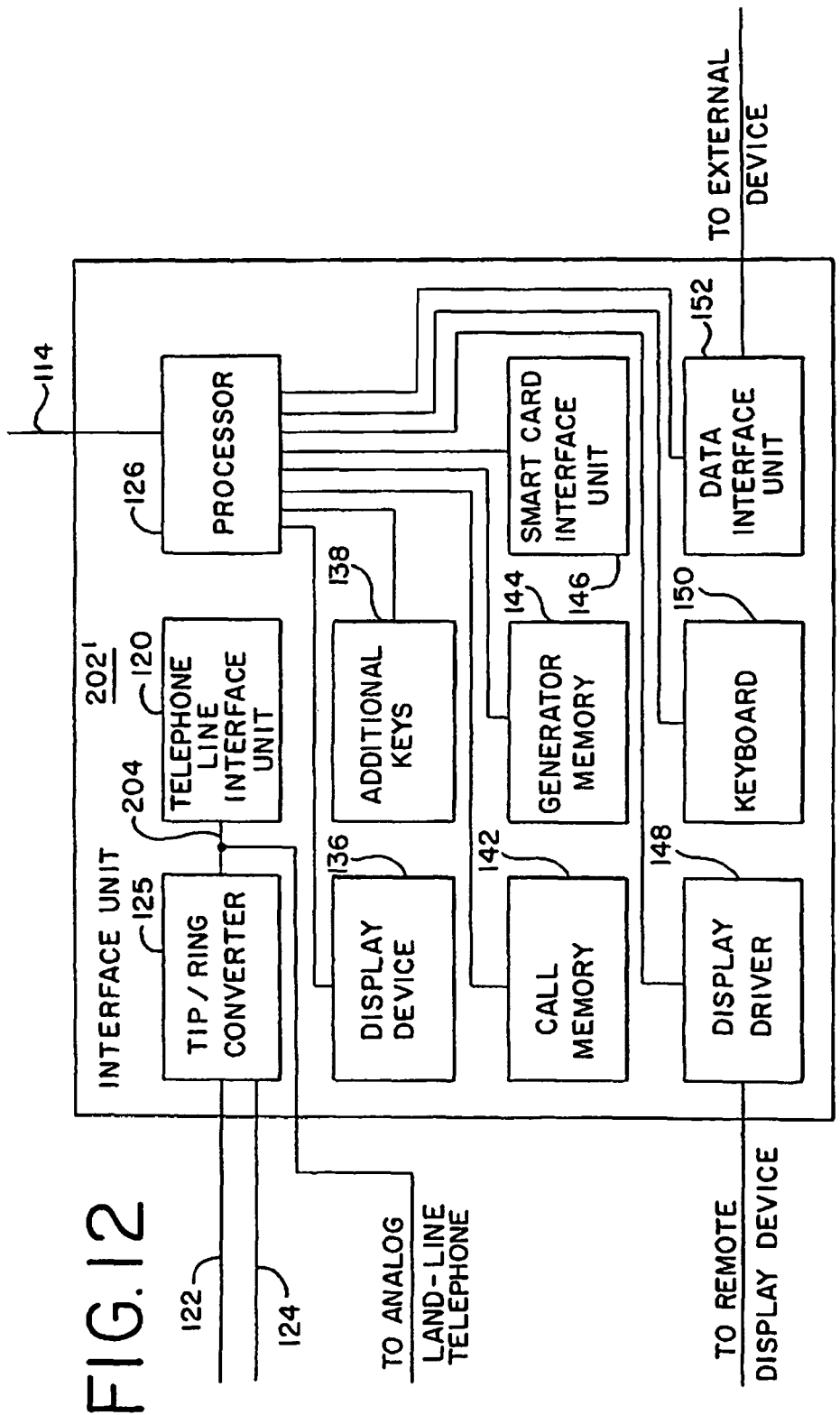

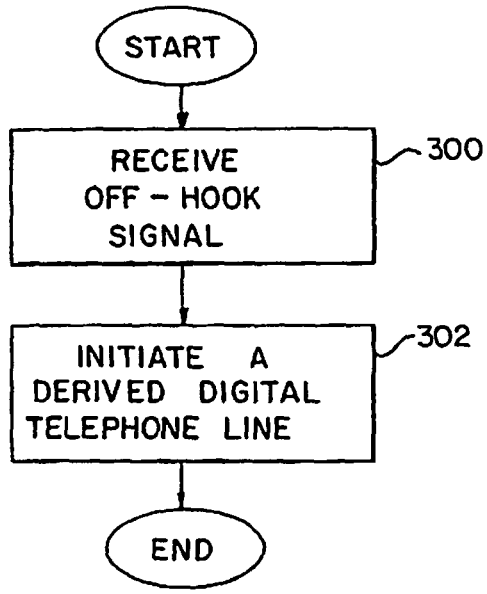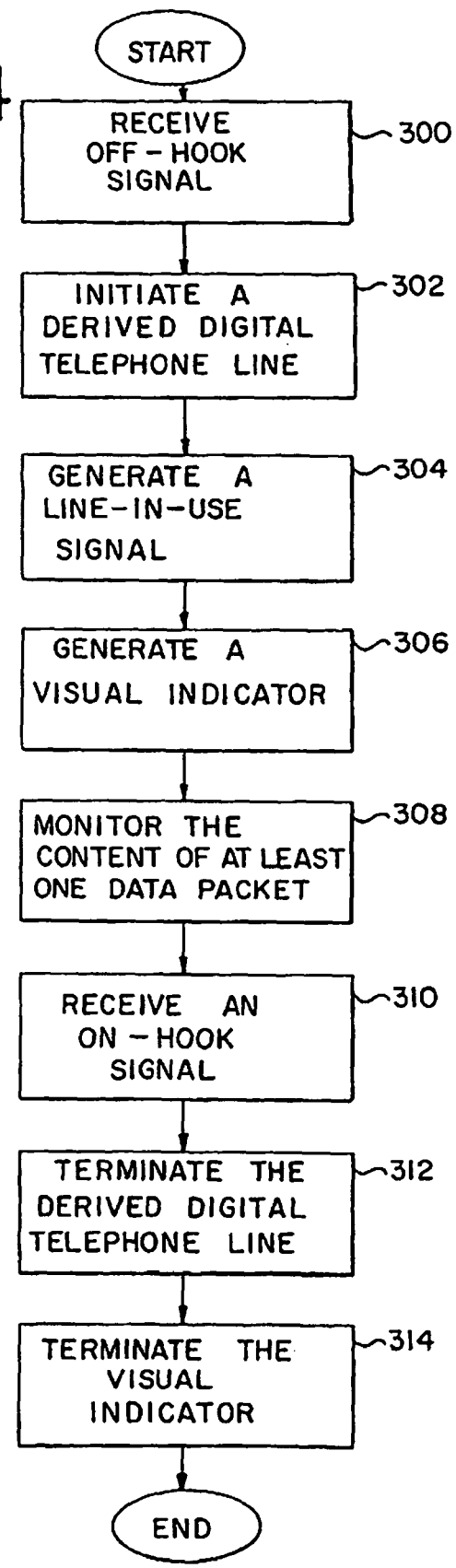

SYSTEM AND NETWORK FOR DERIVING VOICE CHANNELS ON A BROADBAND COMMUNICATION LINE

CROSS-REFERENCE TO RELATED APPLICATIONS

The present U.S. Utility patent application claims priority pursuant to 35 U.S.C. §120, as a continuation, to the following U.S. Utility patent application which is hereby incorporated herein by reference in its entirety and made part of the present U.S. Utility patent application for all purposes:
1. U.S. Utility application Ser. No. 12/424,303, entitled "WIDE AREA COMMUNICATION NETWORKING," filed Apr. 15, 2009, pending, which claims priority pursuant to 35 U.S.C. §120, as a continuation, to the following U.S. Utility patent application which is hereby incorporated herein by reference in its entirety and made part of the present U.S. Utility patent application for all purposes:
2. U.S. Utility application Ser. No. 11/670,162, entitled "WIDE AREA COMMUNICATION NETWORKING," filed Feb. 1, 2007, issued as U.S. Pat. No. 7,525,990, which claims priority pursuant to 35 U.S.C. §120, as a continuation, to the following U.S. Utility patent application which is hereby incorporated herein by reference in its entirety and made part of the present U.S. Utility patent application for all purposes:
3. U.S. Utility application Ser. No. 10/679,197, entitled "WIDE AREA COMMUNICATION NETWORKING," filed Oct. 2, 2003, abandoned, which claims priority pursuant to 35 U.S.C. §120, as a continuation, to the following U.S. Utility patent application which is hereby incorporated herein by reference in its entirety and made part of the present U.S. Utility patent application for all purposes:
4. U.S. Utility application Ser. No. 09/836,000, entitled "WIDE AREA COMMUNICATION NETWORKING," filed Apr. 16, 2001, abandoned, which claims priority pursuant to 35 U.S.C. §120, as a continuation, to the following U.S. Utility patent application which is hereby incorporated herein by reference in its entirety and made part of the present U.S. Utility patent application for all purposes:
5. U.S. Utility application Ser. No. 09/296,954, entitled "WIDE AREA COMMUNICATION NETWORKING," filed Apr. 22, 1999, issued as U.S. Pat. No. 6,335,936.

Moreover, the present application is related to the following co-pending patent applications that are assigned to the same assignee as the present invention, the subject matter of which are incorporated in their entirety herein by reference thereto:
1. "Method and Apparatus for Providing a Derived Digital Telephone Voice Channel," Ser. No. 08/742,164, filed on Nov. 1, 1996, abandoned.
2. "Home Gateway System Telephony Functions and Method," Ser. No. 09/061,833, filed on 416/1998, abandoned.
3. "Telecommunication System, Method and Subscriber Unit for Use Therein," Ser. No. 09/119,094, filed on Jul. 20, 1998, issued as U.S. Pat. No. 6,370,149 on Apr. 9, 2002.
4. "System for Wide Area Computer Network", Ser. No. 09/296,232, filed on Apr. 22, 1999, issued as U.S. Pat. No. 6,206,181 on Mar. 27, 2001.
5. "Method and System for Providing Facsimile Service Over A Digital Subscriber Line, Ser. No. 09/296,233, filed on Apr. 22, 1999, issued as U.S. Pat. No. 6,285,671 on Sep. 4, 2001.

TECHNICAL FIELD

The present invention relates to telecommunication systems, and more particularly to a wide area communication network.

BACKGROUND

Present digital subscriber line (DSL) services are connected from a subscriber location to an internet service provider (ISP). DSL or ADSL (Asymmetric Digital Subscriber Line) provides a large bandwidth pipe that is ideal for communication networking. However, DSL uses the ATM (asynchronous transfer mode) protocol to transport the data over a twisted pair of copper wires. Typically, DSL is run over the local loop portion of the telephone network. ATM is a connection oriented service and most DSL lines are set up as a single permanent virtual circuit to an ISP. This single permanent virtual circuit does not allow other communication applications to use the DSL line. For instance, a user may want to share computer data over the DSL line without running over the internet. In addition, a user may want to use the DSL line for voice or facsimile data. None of these applications are allowed with present DSL services.

Thus, there exists a need for a wide area communication network that can run over DSL lines.

BRIEF DESCRIPTION OF THE DRAWINGS

The invention is pointed out with particularity in the appended claims. However, other features of the invention will become apparent and the invention will be best understood by referring to the following detailed description in conjunction with the accompanying drawings in which:

FIG. 12 presents a block diagram representation of an interface unit in accordance with the present invention.

FIG. 13 presents a flowchart representation of a method in accordance with the present invention.

FIG. 14 presents a flowchart representation of a method in accordance with the present invention.

DETAILED DESCRIPTION

The various embodiments of the present invention yield several advantages over the prior art. The embodiments described herein allow a small business to setup a wide area communication network. This allows small businesses to transmit voice, data, facsimile, video and other data over a wide area communication network having DSL lines. Note that FIGS. 1-17 describe a variety of background information about digital subscriber lines and a method of deriving a telephone line. FIGS. 18-23 show embodiments of a wide area communication network.

Figure 1:
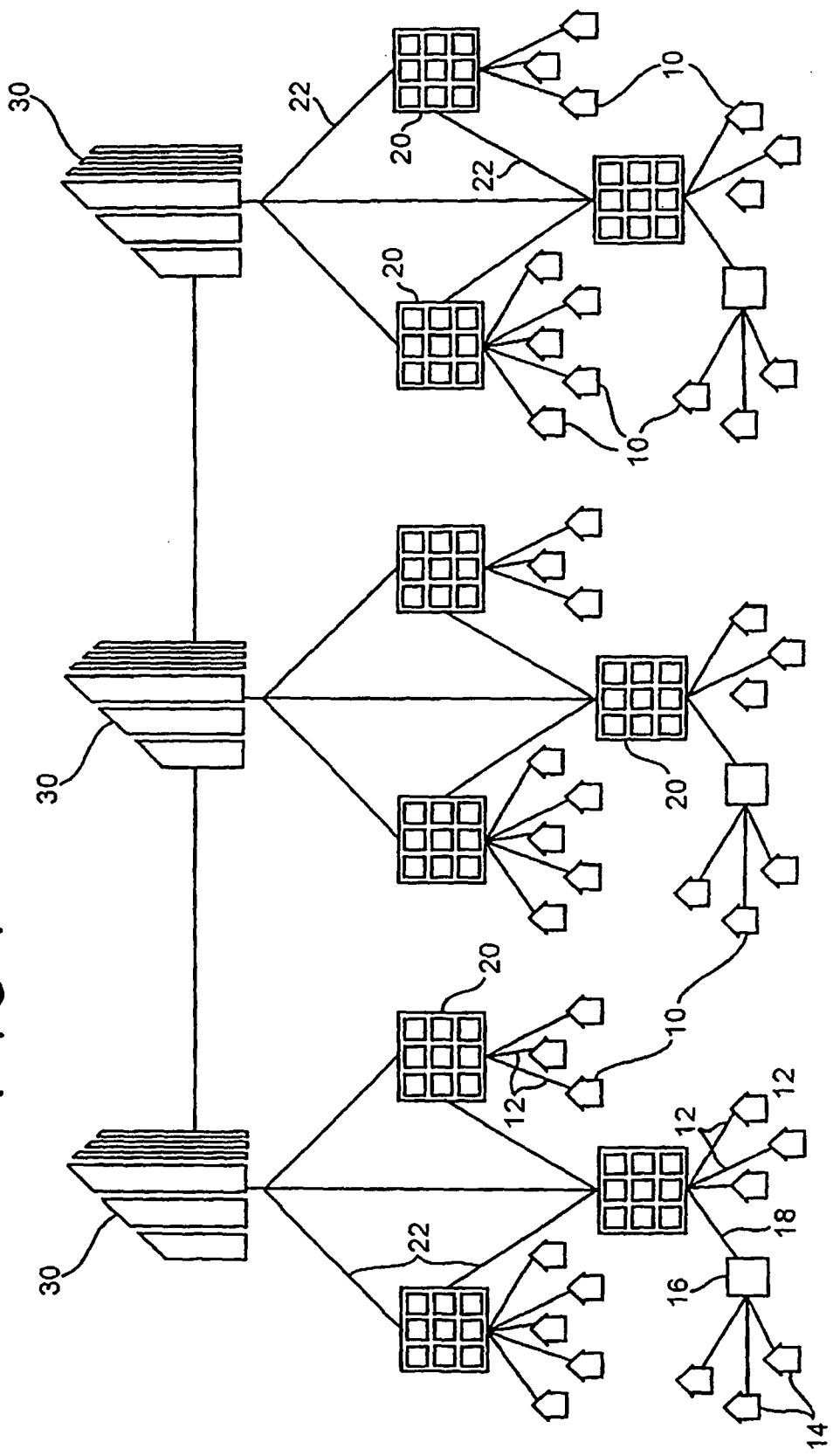
FIG. 1 shows a schematic diagram of a telephone network in accordance with the present invention.

FIG. 1 shows a schematic diagram of a telephone network in accordance with the present invention. Telephone subscribers 10 are typically serviced by analog telephone lines carried to the central office 20 by a subscriber loop 12 including twisted pairs of copper wires. A is number of subscribers 14 may also be connected by subscriber loops to a remote terminal 16 which combines a number of subscribers 14 onto a digital multiplexed data line 18 for transmission to the central office 20. For example, a 24 channel multiplexed T1 line is commonly used in North America for the data line 18.

Typically, a number of central offices 20 are connected by direct trunk circuits 22 or through tandem locations 30. The tandem locations 30 provide trunk circuits 22 to connect two central offices or other tandem locations 30. The tandem locations 30 can thus provide connections between central offices which do not have direct interconnecting trunks. It is to be understood that telephone switching networks may have multiple levels of tandem switching or other network topologies. The unique features of the present invention will be identified with respect to the features of the components of the network and their unique configuration.

Figure 2:
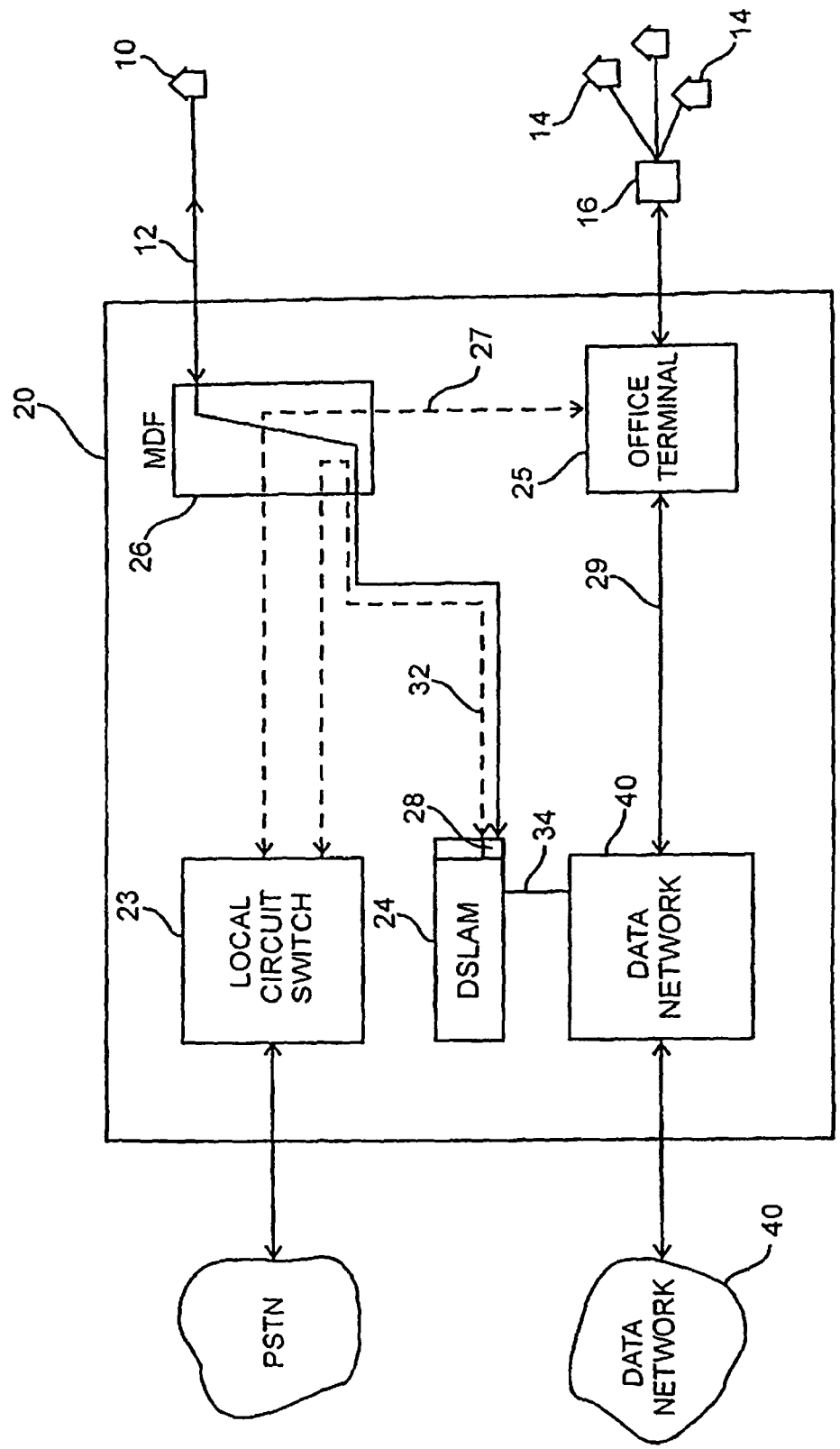
FIG. 2 shows a block diagram of the telco central office 20 of FIG. 1 in accordance with the present invention.

FIG. 2 shows a block diagram of the telco central office 20 of FIG. 1 in accordance with the present invention. The central office 20 preferably includes a means to provide analog telephone lines such as conventional POTS. Conventional POTS is typically handled by the local telephone switching device 23. Local telephone switching devices such as a Northern Telecom DMS-100 or Lucent No. 5 ESS are well known to those skilled in the art. In alternative embodiments, an analog telephone line may also be provided by a Centrex type service or private branch exchange (PBX). As known to those skilled in the art, an analog telephone service may also be provided by a digital carrier system such as a T1 carrier or other type of concentrator.

In addition to POTS service, the central office may also include a means to provide a digital data line. For example, a digital data line may be implemented by a digital subscriber line access multiplexer (DSLAM) 24 to multiplex traffic from digital subscriber loops. Digital subscriber loops or digital carrier systems provided by remote terminal 16 and office terminal 25 provide digital data lines which enable subscribers 10 (FIG. 1) to transmit large amounts of digital multiplexed data traffic over the POTS twisted pair telephone line. The digital subscriber loop is preferably an Asymmetric Digital Subscriber Line (ADSL). ADSL typically implements a digital subscriber line with a maximum data rate from the central office 20 to the subscriber 10 which is higher than the maximum available data rate from the subscriber 10 to the central office 20. For example, ADSL typically provides an asymmetric data rate of 1.5 megabits-per-second (mbs) to the subscriber from the central office and about 400 kilobits-per-second (kbs) from the subscriber location to the central office. Most preferably, ADSL implements an ATM data transmission protocol between the subscriber 10 (FIG. 1) and the central office 20. Of course, other types of data transmission protocols may be utilized. In alternate embodiments, the digital data line may be provided by other types of digital carrier systems such as a SONET (Synchronous Optical Network) based digital systems.

As shown in FIG. 2, the subscriber loop pairs 12 carrying both analog voice and digital data traffic from subscribers 10 to the central office 20 are terminated at a main distribution frame (MDF) 26. From the MDF 26, the subscriber loops 12 are connected to a means for separating POTS voice 32 frequencies from digital data traffic 34 such as a splitter 28, for example. Preferably, the splitter 28 is implemented by the DSLAM 24. The internal operation of the splitter 28 will be described later in more detail in connection with a splitter at the subscriber 10.

The splitter 28 preferably has two outputs: one for POTS signals and another for data traffic. From the splitter 28, the separated POTS voice signals 32 are connected back to the MDF 26 and onto the local switching device 23 handling POTS telephone calls. The data traffic output of the splitter 28 is directed to the DSLAM 24 to multiplex the digital data into a format suitable for transport on a data network 40. Preferably, the DSLAM 24 multiplexes and packages a number of lower signal rate digital data lines to a SONET OC-3 or a DS-1 rate signal which is carried by a fiber optic network. Depending on the data network 40, the DSLAM 24 may operate at higher bit rates such as those appropriate for SONET OC-12. It should be understood that the data network 40 may be of many different topologies. Preferably, the data network 40 is connected to a tandem location 30 to allow access to other central offices.

In the case of subscriber loops that are connected to the central office through a digital loop carrier system (i.e., a remote terminal 16 and an office terminal 25), the DSLAM 24 and its splitter 28 are preferably placed at the remote terminal 16. The data and voice signals are separated with the splitter 28, as described above. The voice signals are carried on the digital loop carrier system to the office terminal 25 where they are connected through the MDF 26 to the local circuit switch 23. Preferably, the data signals are carried on a separate optical fiber or SONET frame in the carrier system so that they can easily be separated from the voice signals in the office terminal 25. These signals are transmitted from the office terminal to the data network 40.

Figure 3:
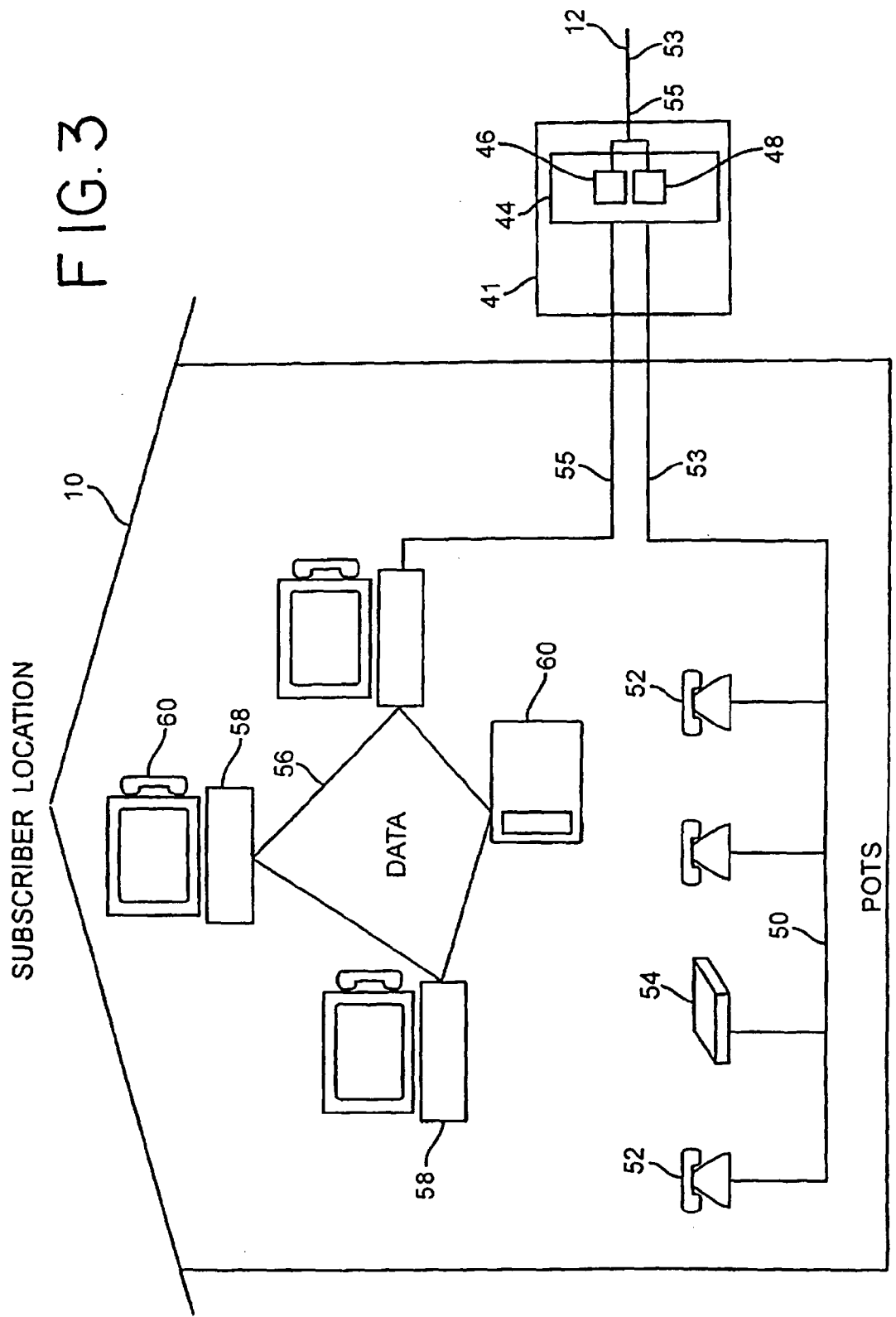
FIG. 3 shows a schematic diagram of a telephone subscriber location 10 such as a typical home or small office in accordance with the present invention.

FIG. 3 shows a schematic diagram of a telephone subscriber location 10 such as a typical home or small office in accordance with the present invention. A network interface device (NID) 41 connects the subscriber to the public switched telephone network (PSTN). The subscriber loop 12 between the subscriber 10 and the central office 20 is terminated at the NID 41. Customer premise equipment (CPE) such as a standard telephone set 52 or other CPE equipment such as a key system, PBX, or computer network 56 to access the PSTN is connected at the NID 41. Voice signals from an analog telephone line 53 and data signals from a digital data line 55 are typically carried to the subscriber 10 on the same subscriber pair 12.

In the preferred embodiment of the invention, the NID 41 includes a means for separating voice frequency signals from data signals. Preferably, a splitter 44 separates voice frequency signals from the data traffic sharing the subscriber loop 12 wire pair. For example, to separate POTS from data traffic, the splitter 44 typically includes a high-pass filter 46 and a low-pass filter 48. To separate POTS voice signals, the low-pass filter 48 blocks high frequency signals, for example signals above 5 KHZ, passing only lower voice frequency signals on a conventional CPE POTS loop 50. The voice signals on the CPE POTS loop 50 are connected to standard telephone 52 such as a Bell 500 set providing conventional POTS service. It should be noted that a conventional computer modem 54 can also utilize the conventional CPE POTS loop 50.

To recover data traffic, the high-pass filter 46 blocks low frequency signals, for example signals below 5 KHz, leaving only high frequency data traffic signals to be sent out on a separate CPE data network loop 56. The CPE data network loop 56 is connected to CPE equipped to access data traffic, for example, a network of personal computers. In the preferred embodiment, the CPE data network 56 implements an asynchronous transfer mode network (ATM). Each of the personal computers 58 is equipped with a ATM network interface card (NIC) to allow the computer to access the CPE data network 56. The NIC 41 preferably also includes data segmentation and reassembly (SAR) capability to packetize data for transmission on the data network 56. Of course, other types of computer networks, such as an Ethernet network, may also be implemented.

Preferably, the CPE data network 56 is also equipped with one or more digital telephones 60 capable of interfacing the data network 56 to allow a subscriber to place a voice telephone call over the CPE data network 56. For example, a digital telephone 60 may be implemented with one of the personal computers 58 on the data network 56 by adding a telephone handset and an appropriate NIC with telephony functions. The telephone handset transmits and receives analog voice signals similar to a conventional handset. The computer/NIC provides SAR capability for converting analog voice to a digital packet stream for transmission over the CPE data network 56. The data network 56 also carries the basic telephony signaling functions. One such system capable of providing such a digital telephone is an ATM network based telephone system from Sphere Communications in Lake Bluff, Ill.

Using the CPE data network 56, the subscriber 10 can place a voice call using a telephone line derived from the digital data line. POTS service operates as a usual over the POTS wiring 50 to provide regular telephone service such as a telephone line carrying analog voice signals. In addition, the data network 56 with digital telephone 60 also has the capability to place voice telephone calls using one or more derived voice lines implemented through the data network, as will be explained below in more detail.

A home gateway system provides a way of integrating the information carrying needs of a homeowner such as a telephone, caller ID, internet-dial up, cable or satellite television by combining their functions. The combination of these devices provides even more new functions such as, home automation and home security.

A home gateway system has a transceiver that is capable of establishing a wireless local loop connection. One embodiment of a home gateway system includes a transceiver connected to a switch. A processor is connected to the switch and provides intelligent functions for the switch. A router is connected to the switch. The router upon receiving a data packet from an internal port with an external address; routes the data packet through the switch to the processor. The processor directs the transceiver to establish a telephony connection with a variety of other systems. Such as, connection to an internet service provider.

A voice processing and caller ID system can be connected to the processor to provide telephony answering and screening services. For instance, a caller ID system can identify an incoming caller and a switch can be used to route these calls to a voice mail system. The caller identification processing system determines a telephone number of the incoming call. Routing the incoming call to the voice processing system if the telephone number belongs to a screened group of telephone numbers. The voice processing system is capable of storing a message from an incoming call.

The transceiver can also be used to establish a communication channel over a wireless local loop for home automation and security. A home automation controller is capable of sending and receiving a message with the wireless local transceiver. A home security controller is capable of sending and receiving a message with the wireless local loop transceiver and the home automation controller. This allows the security system and the automation system to be activated, deactivated and monitored remotely.

Figure 24:
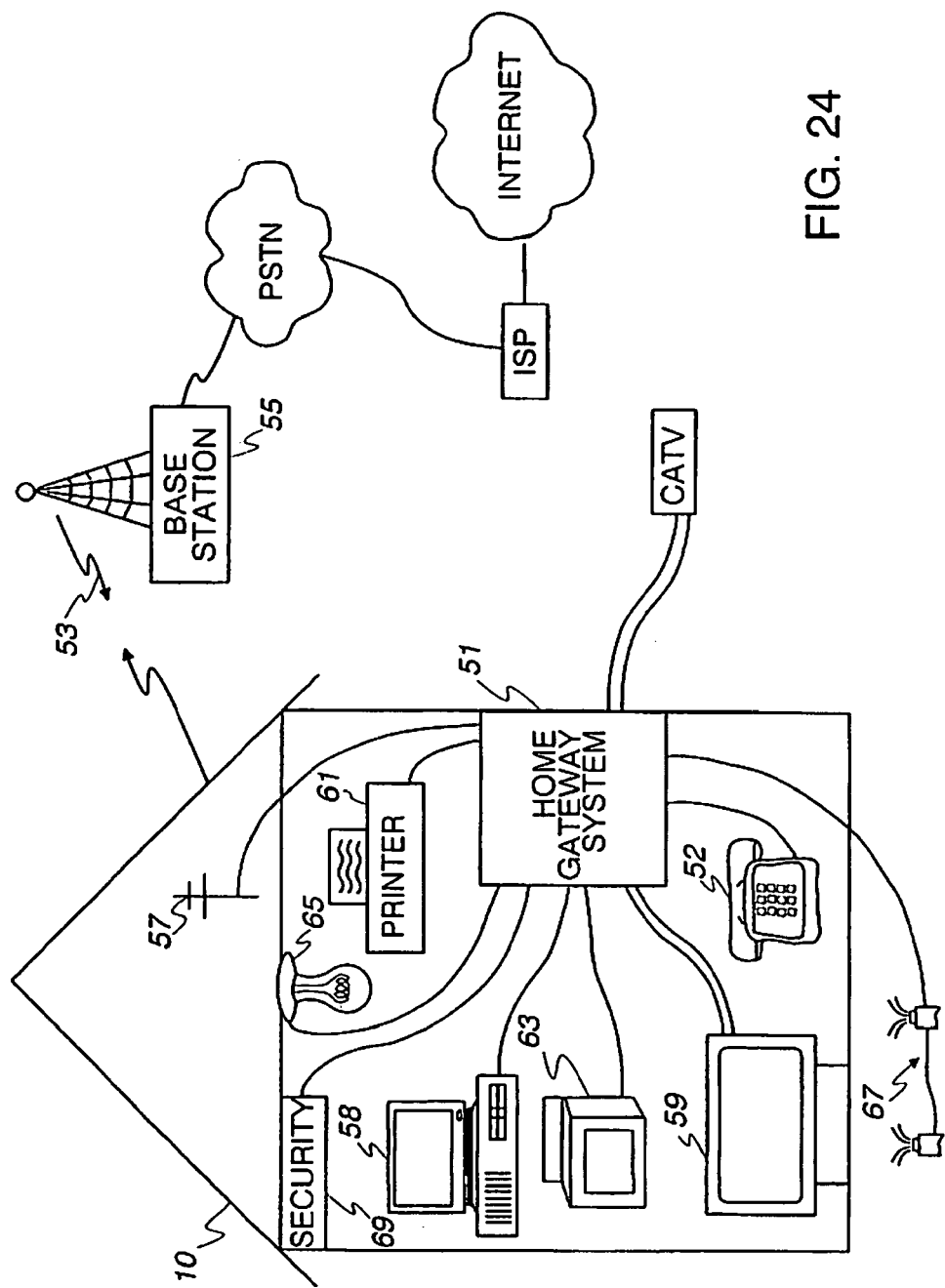
FIG. 24 is a schematic diagram of a home gateway system connected to a variety of information carriers in accordance with one embodiment of the invention.

FIG. 24 is a schematic diagram of a home gateway system 51 with telephony functions connected to a variety of communication carriers in accordance with one embodiment of the invention. The home gateway system 51 is located inside a house or subscriber location 10. The home gateway system 51 has an input to receive a cable television (satellite, XDSL, ADSL) 24 signal. The home gateway system 51 is also connected by a wireless local loop 53 and a base station 55 to the public switch telephone network (PSTN). The antenna 57 for the wireless local loop 53 is shown in the attic of the house 10. The PSTN provides access to an internet service provider (ISP), which provides access to the internet. A telephone 52, television 59, computer 58 and printer 61 can all be connected to the home gateway system 51. The home gateway system 20 allows the computer 58 to talk to the printer 61 or to the ISP. The telephone 52 can place a standard telephone call over the PSTN or place a data telephone call over the internet (Note data telephone call means a call over data service such as the internet). In addition, appliances 63, lights 65 and sprinkling systems 67 can be connected to the home gateway system as part of the home automation features. A home security system 69 can also be connected to the home gateway system 51. This allows the home automation and security features to be integrated into the home communication system. For instance, the computer 58 can be used to setup times of day for the sprinkling system to turn on or the computer can print a report of the activities of the appliances or the security systems.

Figure 25:
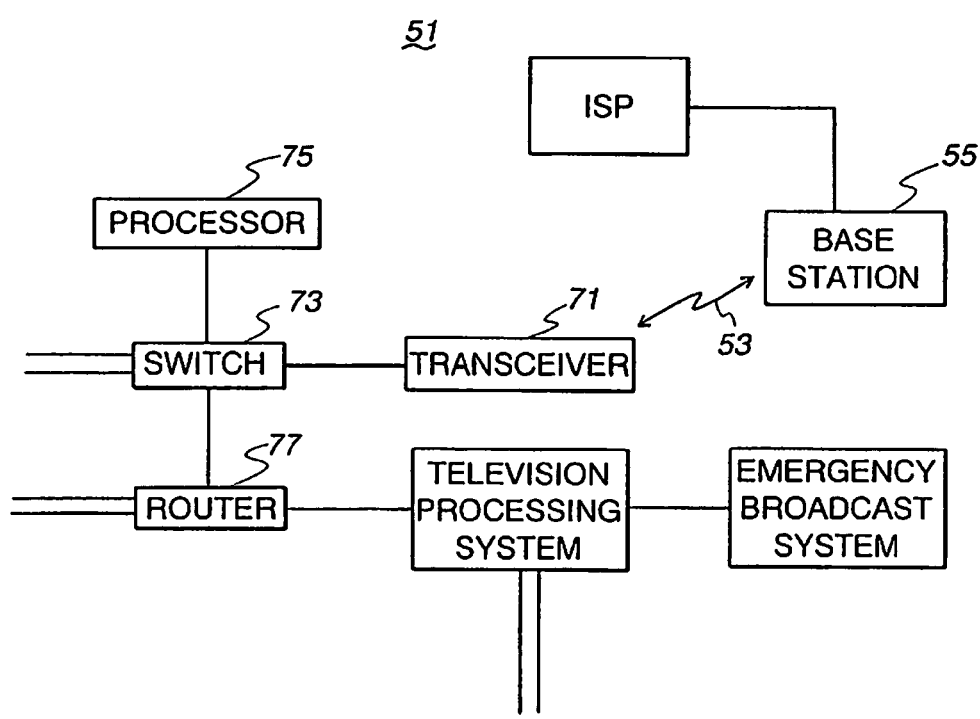
FIG. 25 is a block diagram a home gateway system in accordance with another embodiment of the invention.

FIG. 25 is a block diagram of a home gateway system 51 in accordance with one embodiment of the invention. The home gateway system 51 has a transceiver 71 capable of establishing a telephony connection with an internet service provider over a wireless local loop 53. The transceiver 71 is connected to a switch 73 (e.g., a LAN switch) having intelligence. The switch 73 is connected to a processor 75 using any number of protocols, such as I.sup.2C, RS232, SS7 etc. The switch 73 is also connected to a router 77 in one embodiment. The connection between the switch and the router may be a standard ethernet connection or TCP/IP connection or any number of standard protocols. The switch 73 in one embodiment is connected to a plurality of telephones and can provide switched connections between the plurality of telephones in the house. A crossbar switch can provide physical connections between the phones and has the intelligence to switch data connections if necessary. The router 77 can be connected to a variety of data devices such as computers, printers, scanners and facsimile machines. The router 77 refers to a standard packet switched device. A data telephony connection (a data telephony connection is a telephone call over a data network such as the internet) can also be established through the router 77. In order to establish a data telephony connection, the router receives a request for an internet telephone connection from an internal port (e.g., an RJ11). The request is routed by the router through the switch 73 to the processor 75 using a protocol such as SS7. The processor 75 determines that the request requires establishing a session with an internet service provider. The processor 75 directs the transceiver 71 to establish a telephony connection with the internet service provider, by sending a command including the internet service providers telephone number to the transceiver 71. The processor 75 then establishes a communication session with the internet service provider as is standard for a dial-up connection. Once the telephony connection and session are established the telephone call proceeds normally. The voice signal is encoded into data packets for transmission over the internet. The ISP upon receiving a request for a data telephony connection can route the information to an internet phone service provider. The internet phone service provider routes the call over the internet to a PSTN switch (POP point of presence) closest to the destination number. This last step is discussed in detail in other patents and will not be described herein. The PSTN switch routes the last part of the call in a standard manner.

Figure 4:
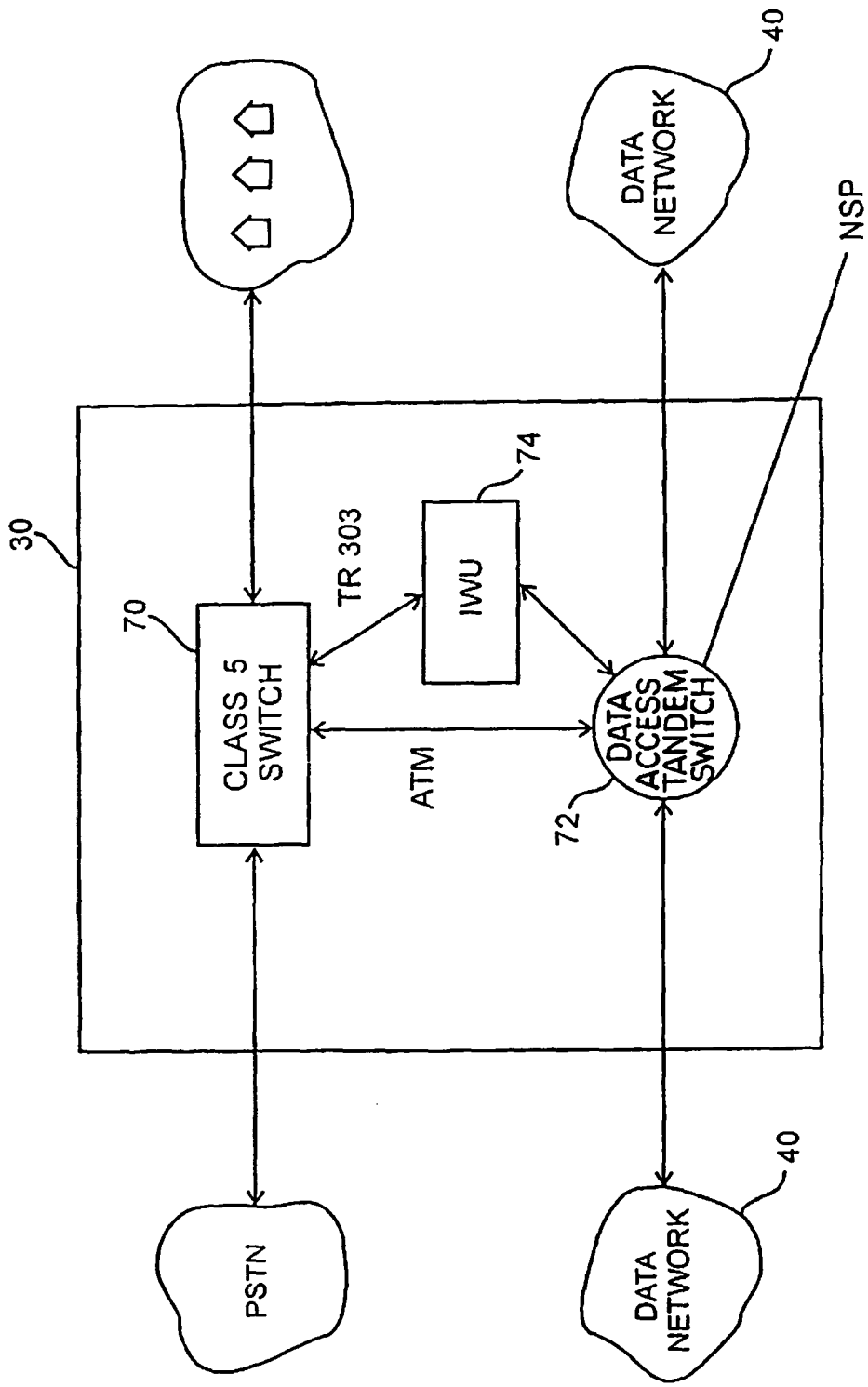
FIG. 4 shows a block diagram of a tandem location in accordance with the present invention.

FIG. 4 shows a block diagram of a tandem location in accordance with the present invention. The Class 5 local switch 70 typically connects local subscriber loops to the telephone network, while a separate tandem voice switch (not shown) provides conventional circuit-switched connections for directing POTS traffic between central offices 20 (FIG. 1) of the PSTN. Class 5 local switches such as the Lucent 5 ESS and the Nortel DMS100, and tandem voice switches such as the Lucent 4ESS and the Nortel DMS 250 are known to those skilled in the art. In comparison, the means for providing data access to data networks is preferably a packet switch handling digital data traffic. For example, a data access tandem switch 72 provides access to data networks carrying digital data traffic. Preferably, the data networks are equipped to accept ATM packet-switched connections. The data access tandem switch 72 is an ATM fabric switch configured to provide virtual connections on demand between end users and providers of data networks and services. The data access tandem switch 72 may connect end users to various network service providers (NSPs) such as UUNet, MCI, Sprintnet, and AADS (Ameritch Advanced Data Services).

The tandem location 30 may also include a means to interface the data access tandem 72 and the Class 5 switch. For example, an interworking unit (IWU) 74 may implement an interface between the data access tandem switch 72 and the Class 5 switch 70 of the PSTN. The IWU 74 enables voice telephone calls carried by the data network 40 to access the PSTN through the Class 5 switch 70. The IWU 74 is capable of converting a voice telephone call in the data network protocol from the data access tandem switch 72 into the circuit-switch protocol of the Class 5 switch 70. Preferably, the IWU 74 interfaces an ATM packet data stream to a multiplexed circuit-switch protocol with dynamic allocation of voice channels such as TR-303.

Figure 5:
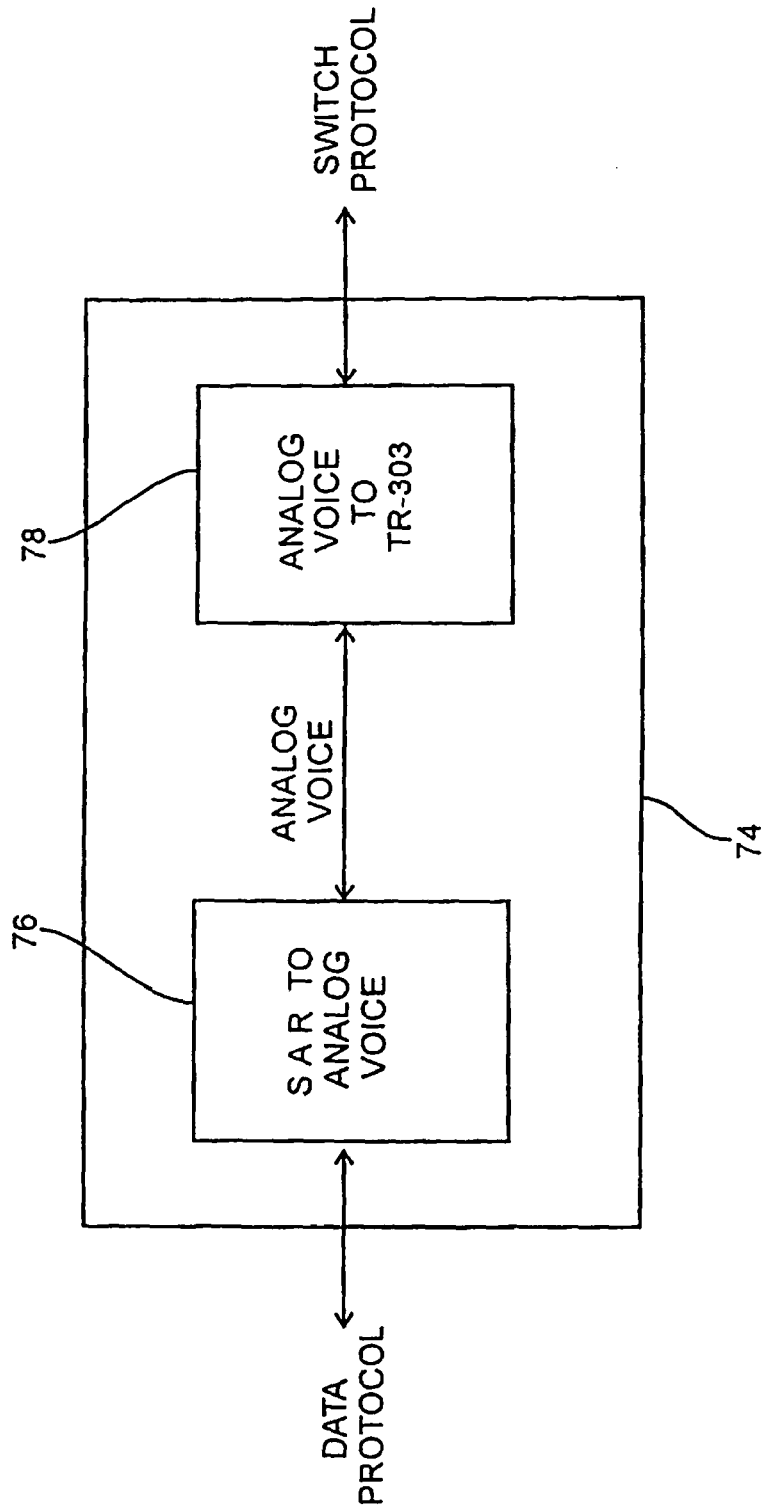
FIG. 5 presents a block diagram representation of an example interworking unit in accordance with the present invention.

FIG. 5 presents a block diagram representation of an example interworking unit in accordance with the present invention. In particular, the IWU 74 performs the SAR 76 of voice data from an ATM stream into a analog voice signal. The analog voice signal is then converted 78 into the data protocol such as a TR-303 protocol. More preferably, as seen in FIG. 4, the IWU 74 converts the packetized ATM voice streams to a digital PCM format which is then converted to the desired TR-303 protocol. It should be noted that the local switch 70 may also be directly connected to a data access tandem 72 without the IWU interface 74. Newer generation digital switches may be capable of directly interfacing with the data transfer protocol of the data access tandem 72. For example, new generation circuit-switches may directly accept an ATM data stream for switching into the PSTN without the need for an IWU.

While a TR-303 protocol is described above, other protocols may likewise be used in accordance with the present invention. In particular, other protocols including a PRI protocol, TR-08 protocol or a TR-57 protocol could likewise be used within the scope of the present invention.

With the system of FIGS. 1-5, a derived voice telephone line using the data network can be implemented and utilized in conjunction with the methods and systems that follow.

A caller places a digital voice call similar to an ordinary telephone call using the digital telephone 60 of FIG. 3. The SAR and A/D function of the digital telephone 60 converts the caller's analog voice signals to a packetized digital data stream for transport over the subscriber data network 56. Preferably, the packetized data stream is in an ATM format.

The subscriber data network 56 carries the derived telephone line data stream to the high frequency portion 55 of the DSL devoted to digital communications. Next the high frequency portion 55 of the DSL is combined with the low frequency portion 53 of the DSL on the subscriber loop 12 where it is transported to the central office 20. Note, the derived telephone line uses the digital data portion 55 of the subscriber data network 56, leaving the lower frequency portion (POTS telephone signal) available for analog telephone voice calls.

At the central office 20 shown in FIG. 2, the splitter 28 separates the derived telephone line data stream from POTS traffic. The derived telephone line data stream is multiplexed by the DSLAM 24 together with a number of data streams or derived telephone line data streams from other subscribers. For example, the DSLAM 24 may combine data streams from a number of different subscribers into a higher rate digital signal such as a DS-3 or OC-3 signal. The telephone line data stream is then carried by the OC-3 signal over the data network 40 to the tandem location 30.

At the tandem location 30 shown in FIG. 4, the derived telephone line and data sessions are switched by the data access tandem 72. Preferably, data sessions to a NSP are directly switched by the data access tandem 72 to the desired NSP without entering the PSTN. For voice calls which must enter the PSTN, the data access tandem 72 directs the derived telephone line data streams to the IWU 74.

The IWU 74 preferably converts the derived telephone line data stream to a voice signal in a TR-303 format which can be switched by the Class 5 telephone switch 70. Through the Class 5 switch 70, the derived voice call enters the PSTN and is switched as a POTS call. If needed, a separate tandem switch establishes a circuit connection to the desired central office 20.

Figure 6:
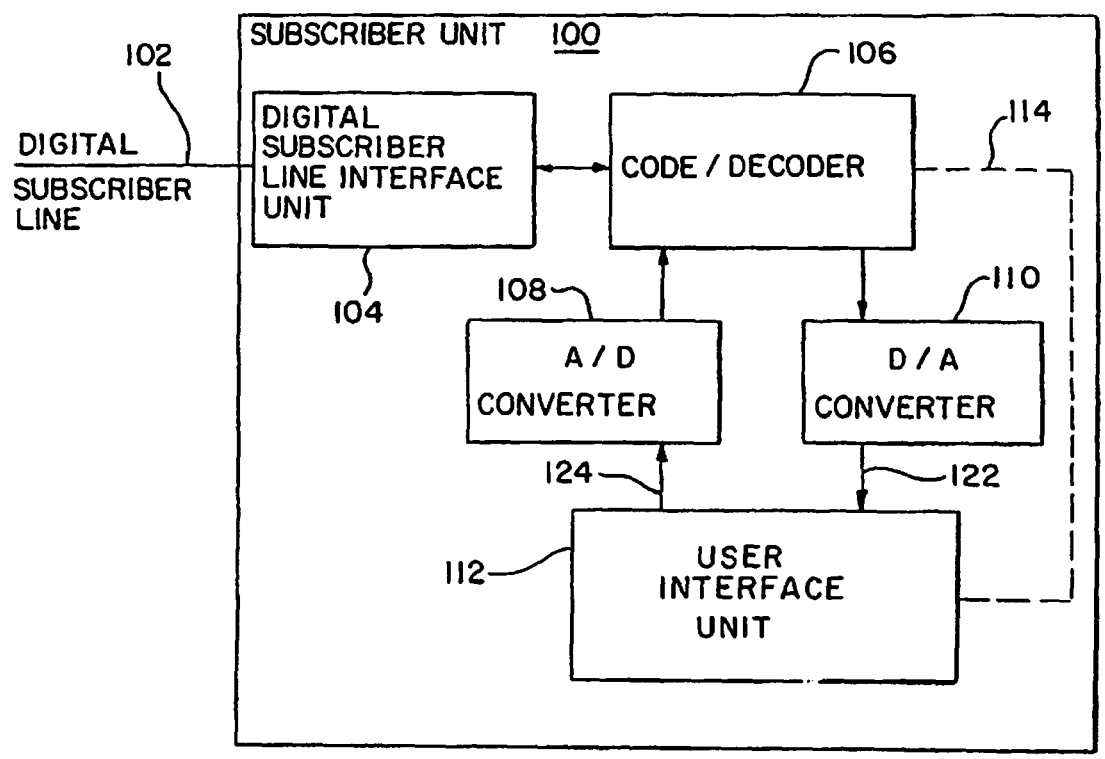
FIG. 6 presents a block diagram of a subscriber unit in accordance with the present invention.

FIG. 6 presents a block diagram of a subscriber unit in accordance with the present invention. In particular, a subscriber unit 100 allows connection with a public switched telephone network. The public switched telephone network has at least one switch and at least one digital subscriber line 102, such as described in FIGS. 1-5, in communication with the switch. In accordance with the present invention, the subscriber unit 100 is operable to send and receive voice calls over the public switched telephone network.

While the various embodiments of the present invention have been described in conjunction with a public switched telephone network, these embodiments could similarly apply to voice communications over other communication networks. In particular, telephone calls, within the scope of the present invention, can be transmitted using a data communications network such as the Internet as a transport medium for a least a portion of a call. In these embodiments of the present invention the functionality of an analog local switch or digital switch could be performed by a server and router corresponding to a local Internet service provider or could include an IP (Internet Protocol) gateway in combination with a central office switch. Further the switch of the present invention could be a central office circuit switch or a packet switch depending on the nature of the network.

The subscriber unit 100 includes a digital subscriber line interface unit 104 receives the plurality of data packets from the digital subscriber line 102 and identifies selected ones of the plurality of received data packets corresponding to a received data stream of a first derived digital telephone. The subscriber unit 100 is further operable to transmit, on the digital subscriber line, a plurality of transmitted data packets corresponding to a transmitted data stream of the first derived digital telephone line.

In one embodiment of the present invention data packets are formatted in accordance with the Asynchronous Transfer Mode (ATM) protocol. Further, a hierarchical protocol structure could likewise be used encompassing, for instance, an Ethernet protocol carried by ATM or an internet protocol (IP) such as TCP/IP carried by ATM. However, other packet data protocols and hierarchical structures and combinations could likewise be implemented within the scope of the present invention.

Packets received by the subscriber unit 100, destined for receipt by subscriber unit 100 include an address, consistent with the particular protocol or protocols used for formatting the data packets, that corresponds to either the subscriber unit 100 or to a corresponding subscriber. In accordance with an embodiment of the present invention whereby an IP is used, data packets directed to the subscriber unit 100 could be identified based on a particular IP node address or URL corresponding to either the particular subscriber unit 100 or to a particular subscriber using subscriber unit 100. Alternatively, an ATM address could be used for the same purpose in an ATM protocol environment.

The subscriber unit 100 further includes a coder/decoder 106. The coder/decoder 106 receives the transmitted data stream from analog-to-digital (A/D) converter 108 and codes the transmitted data stream into the plurality of transmitted data packets. The coder/decoder 106 also receives the plurality of received data packets from the digital subscriber line interface unit 104 and decodes the plurality of received data packets into a received data stream to be transmitted to the digital-to-analog (D/A) converter 110 on line 122.

Analog-to-digital converter 108 converts a transmitted analog signal from user interface unit 112 into the transmitted data stream. Digital-to-analog converter 110 converts the received data stream into a received analog signal for transmission to the user interface unit 112 on line 124.

In this fashion, digital subscriber line interface unit 104, coder/decoder 106, A/D converter 108 and D/A converter 110 operate in concert to send and receive basic telephony signaling between the digital subscriber line 102 and an user interface unit 112. This user interface unit 112 provides the basic functionality of a standard analog telephone set. In particular, the user interface unit 112 provides an interface to a user of the subscriber unit and, at a minimum, generates the transmitted analog signal sent to A/D converter 108 and generates an acoustic signal based on at least a portion of the received analog signal.

In an alternative embodiment of the present invention, a direct data path 114 is provided for communicating with the user interface unit 112. This data path could carry the transmitted data stream, the received data stream or both. In embodiments of the present invention where the user interface unit 112 includes a processor, data path 114 is advantageous to allow direct digital communication without need for the conversion to analog and then back to digital data.

Figure 7:
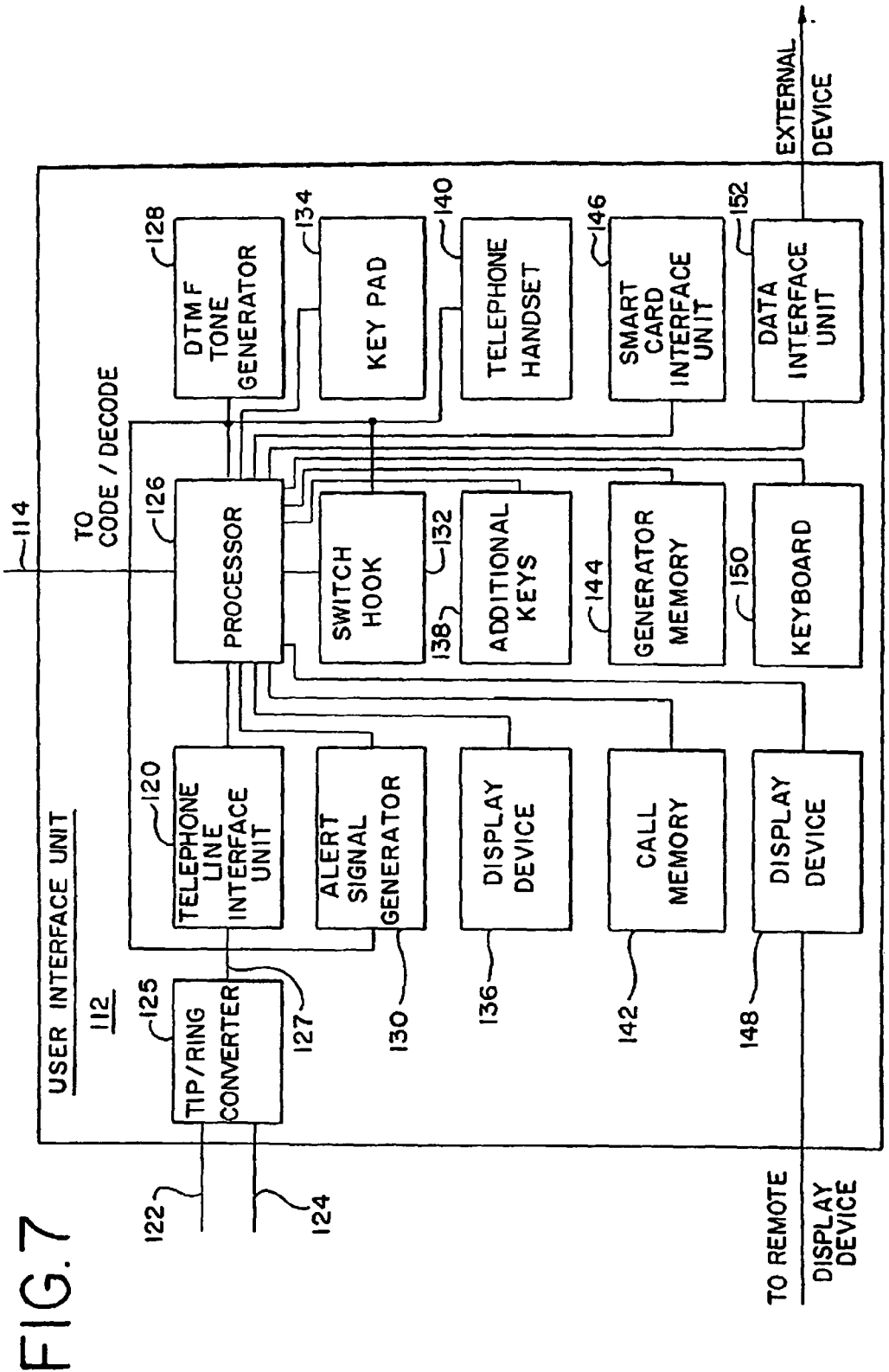
FIG. 7 presents a block diagram representation of a user interface unit in accordance the present invention.

FIG. 7 presents a block diagram representation of an user interface unit in accordance with the present invention. In particular, user interface 112 of FIG. 6 is shown in more detail in accordance with various alternative embodiments.

User interface unit 112 optionally includes a telephone tip/ring converter 125 that converts the analog signal line 122 from the D/A converter 110 to appear as a typical tip/ring pair 127 to telephone line interface unit 120. In particular, tip/ring converter 125 adds a voltage bias and provides any necessary generation or conversion of signal levels from line 122 to appear as a standard analog telephone line, even though the analog signals such as voice and ringing signals on line 122 where transported over a packet data line. In various embodiments of the present invention, the functionality of D/A converter 110, A/D converter 108 and tip/ring converter 125 perform the functions of a line card used in conjunction with a digital central office switch.

Optional telephone line interface unit 120 provides an interface between processor 126 and tip/ring converter 125 by converting basic telephony signals such as on-hook, off-hook, and ring signals for detection by the processor or for generation by the processor to the tip/ring pair 127. In this embodiment, keypad 134 and DTMF tone generator 128, switch hook 132, alert signal generator 130 and telephone handset 140 are further coupled to the tip/ring pair 127 for directly responding to, and/or for generating, the basic telephony signals carried by tip/ring pair 127 in a manner familiar to those skilled in the art.

While the present invention is described as including a switch hook, other similar devices could likewise be used, including a flash key or a receive button, within the scope of the present invention.

However, processor 126, including a plurality of interface ports (not specifically shown) and general memory 144, is likewise capable of responding to and/or directly generating the basic telephony signals in a similar manner. In this fashion, dialed numbers can be recorded and stored for redialing or speed dialing purposes, conditions requiring distinctive ringing patterns can be detected and distinctive rings can be generated, stored voice signals can be generated and received voice signals can be analyzed, and on-hook and off-hook signaling can be generated without the use of the switch hook.

In an alternative embodiment of the present invention the functionality supplied by tip/ring converter 125 and telephone interface unit 120 could be supplemented or supplanted by direct digital connection 114 to processor 126. The plurality of interface ports (not specifically shown) of processor 126 could provide the appropriate conversion from the analog devices such as keypad 134 and DTMF tone generator 128, switch hook 132, alert signal generator 130 and telephone handset 140.

In various embodiments of the present invention the user interface unit advantageously includes a display unit. In various embodiments, this display unit is a liquid crystal display (LCD) capable of displaying information relating to incoming and outgoing calls in additional to command and control information for the operation of the subscriber unit. In particular, a graphical user interface (GUI) for operation of the telephone is implemented using the processor 126, the display device 136 and additional keys 138.

In a further embodiment of the present invention the additional keys are distributed adjacent to the display unit, the plurality of keys operable by the user to activate selected ones of a plurality of call control options displayed on the display device adjacent thereto. In this fashion, a plurality of call control options such as call transfer, hold, redial, conferencing, forwarding, speed dialing, hands free, line release, line selection, etc., can be implemented by a user by the presentation of a menu of commands and by pressing the key adjacent to the displayed command on the display device.

The display device 136 is further capable of displaying a plurality of data relating to an outgoing call, for instance, by monitoring the digits dialed by the user and by displaying destination telephone number reflected by these digits. The processor further is operable to time the duration of the call from the time the telephone line is off-hook and displaying the duration on the display device 136. Call memory 142 is available for storing the plurality of data relating to an outgoing call for a plurality of outgoing calls. This data can be retrieved and reviewed by the user or can be downloaded to an external device coupled to the subscriber unit through data interface unit 152.

Processor 126 is further capable of receiving and decoding caller identification data relating to the identity of an incoming caller and the display unit is capable of displaying a plurality of data relating an incoming call. In this fashion, caller ID signals received during the silent interval between the first and second rings of an incoming telephone call can be decoded and displayed to the user before the corresponding line is taken off-hook.

Similarly, for a subscriber to a caller ID/call waiting service who is engaged in a conversation with a first caller, the processor 126 can receive the caller ID information corresponding to a second caller and display it to a user for determination if the first caller should placed on hold and the second call should be answered. Additionally, the call disposition features corresponding a caller ID/call waiting deluxe could likewise be implemented using the display and either the keys of keypad 134 or the additional keys 138.

Call memory 142 is likewise available for storing a plurality of data relating to an incoming call for a plurality of incoming calls. The plurality of data relating the incoming call includes caller ID information of the calling party, the duration of the call (if the call was completed), and data indicating if the incoming call includes a facsimile message. In this embodiment of the present invention the stored data can be retrieved and displayed or downloaded as discussed earlier in conjunction with outgoing call data.

While many of the forgoing discussions have addressed the accessing of a single line, in various embodiments of the present invention the subscriber unit 100 is capable of monitoring and accessing multiple telephone lines, at least one of which is a derived digital telephone line. In these embodiments the display device 136 is capable of showing the status a plurality of lines, and the user is capable of accessing and placing calls on any one of a plurality of lines.

Further, the subscriber unit 100, through the use of processor 126 and in response to a signal generated by the user interface unit 112 and in response to an action of the user, is capable of initiating a connection to a remote central office on one or more derived digital telephone lines carried by the digital subscriber line. In this embodiment of the present invention the processor 126, coupled to the coder/decoder 106, and digital subscriber line interface 104, is capable of accepting data corresponding to a second derived digital telephone line in addition to a first derived digital telephone line, and the processor 126 is further capable of monitoring the status of the second derived digital telephone line. More generally, the subscriber unit 100, in response to a signal generated by the user interface unit 112 in response to an action of the user, is capable of initiating up to N additional derived digital telephone lines, where N is greater than 2.

In an additional embodiment of the present invention the user interface unit 112 further comprises a smart card interface unit 146 capable of accepting and communicating with a smart card (not specifically shown). Preferably, smart card interface unit 146 is compatible with PCMCIA standards and can accept any of a wide variety of such smart cards. In one such embodiment, the smart card inserted into the smart card interface unit 146 stores a plurality of data associated with the user and wherein the processor 126 is capable of downloading a plurality of smart card data from a smart card so that the use of the subscriber unit 100 can be personalized to the particular user.

In one embodiment of the present invention the plurality of smart card data includes a protocol address such as a IP node address or an ATM address corresponding to the user. In this fashion, the address of the telephone could change or be overridden by the address of the user downloaded from the smart card so that calls directed to the user could be sent to the particular subscriber unit 100 over a derived digital telephone line. Once the data was downloaded from the smart card, the subscriber unit can automatically register the presence of the subscriber at the location of the particular subscriber unit 100 by sending a data message to the remote central office over the digital subscriber line. Alternatively, the registration of the presence of the user at the particular subscriber unit 100 containing the smart card could be optionally effectuated only upon activation of the user either in response to a query by the subscriber unit, such as in response to a message displayed on the display device 136 or by action of the user in the absence of such a query.

In a further embodiment of the present invention the smart card data contains other personal options of the user including custom set-up and command options for the subscriber converter. These set-up and command options could include device macros for performing a series of commands on the subscriber unit at the touch of a single button and could also include a user's speed dial list.

In another embodiment of the present invention the user interface unit 112 further includes a keyboard 150 and wherein the subscriber unit is capable of communication with a first data service over the digital subscriber loop. In this fashion the subscriber unit 100 can operate as a PC or network computer to access data services such as internet or world wide web services from the subscriber unit 100. In one such embodiment the communication with the first data service over the digital subscriber loop could use data packets that do not correspond to a derived digital telephone line. However, one or more derived digital lines could, nevertheless, be used for this purpose. In this embodiment the user interface unit 112 further includes a display driver 148 for driving a remote display device. In an applications where communicating with a first data service the device driver 148 allows the use of a larger display than might be integrated in the subscriber unit itself.

In a further embodiment of the present invention, the subscriber unit 100 specifically includes the functionality of a fax modem. In the fashion, the subscriber unit 100 is operable to send a receive a plurality of fax messages. In this embodiment a received fax message or fax message to be sent could be communicated to/from the subscriber unit using the data interface unit 152 in combination with a document scanner or a printer or other specific device.

In an additional embodiment of the present invention, the subscriber unit, under the control of processor 126, performs the functionality of a answering machine where greetings are stored and played to incoming callers, and messages from callers are stored in a memory device such as general memory 144.

Figure 8:
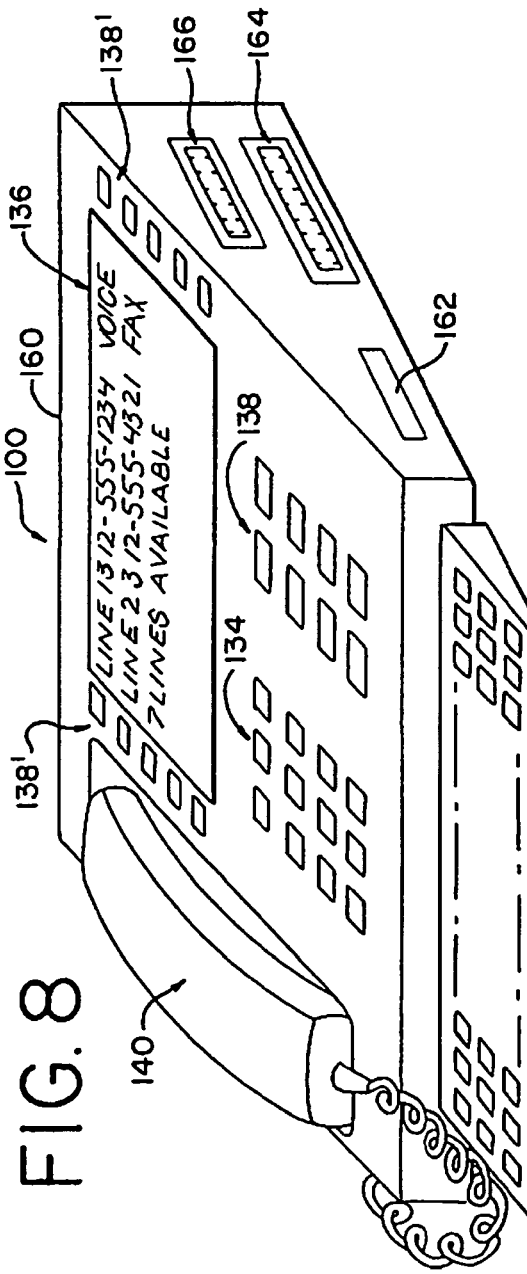
FIG. 8 presents a perspective view of a subscriber unit in accordance with the present invention.

FIG. 8 presents a perspective view of a subscriber unit in accordance with the present invention. In particular, a subscriber unit 100 is presented that incorporates the various features and options presented in conjunction with the descriptions of FIG. 6 and FIG. 7. Housing 160 includes an integral display device 136, keypad 134 and telephone handset 140. Additional keys 138 (that are not adjacent to the display device 136) and additional keys 138' that are adjacent to the display device 136 provide access to advanced controls and features of the subscriber unit 100. Smart card slot 162 corresponds to smart card interface unit 146 disposed within the housing. Display device jack 166 is coupled to display driver 148 within the housing 160 and data interface jack 164 is coupled to data interface unit 152 also disposed within the housing 160.

Figure 9:
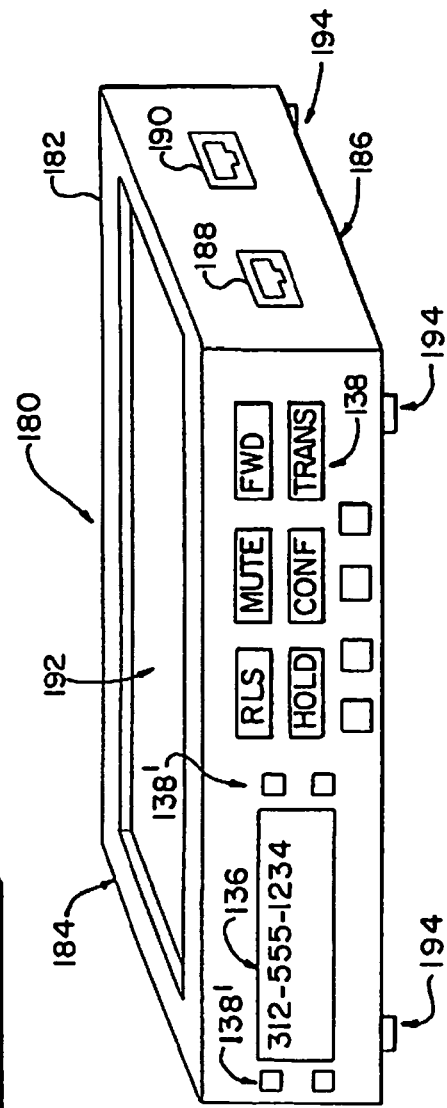
FIG. 9 presents a perspective view of a subscriber interface unit in accordance with the present invention.

FIG. 9 presents a perspective view of a subscriber interface unit in accordance with the present invention. In particular, FIG. 9 presents a subscriber interface unit for use in a telecommunication system including a switch, a local loop coupling the switch to a subscriber location. In this embodiment, a segment of the local loop includes copper twisted pair and the asymmetrical digital subscriber line is carried by the local loop. Further, the asymmetrical digital subscriber line carries a plurality of derived digital telephone lines as described in conjunction with FIGS. 1-5. The subscriber interface unit of FIG. 9 advantageously couples the asymmetrical digital subscriber line to an analog land-line telephone.

Subscriber interface unit 180 includes a housing 182 having a top surface 184 and a bottom surface 186 substantially coplanar to the top surface. An electrical coupler 188 provides a connection to a cable capable of carrying the asymmetrical digital subscriber line. An RJ-11 jack 190 provides a connection to a cable of the analog telephone (not specifically shown). A converter 200, disposed within the housing, coupled to the electrical coupler 188 and to the RJ-11 jack 190, converts the first analog signals generated by the analog telephone into a first plurality of data packets for transmission to a selected one of the plurality of derived digital telephone lines and converts a second plurality of data packets received from the selected one of the plurality of derived digital telephone lines into a second analog signal for transmission to the analog telephone.

In a particular embodiment of the present invention the subscriber interface unit 180 includes several optional features that correspond to features described in conjunction with the subscriber unit 100. Components that are common with subscriber unit 100 are assigned common reference numerals. In addition, subscriber unit 180 includes a first indented portion 192 of top surface 184 for accepting the analog telephone on top thereof. A plurality of non-skid feet are coupled to the bottom surface 186 of the housing 182.

While an RJ-11 jack 190 is shown for coupling to the analog land-line telephone, many other electrical connections including other plug and jack combinations are possible within the scope of this embodiment of the present invention. In a one embodiment of the present invention the digital subscriber line is carried by the standard telephone wiring within a home. In this embodiment, electrical coupler 188 is also implemented using an RJ-11 jack, however, like the RJ-11 jack 190, other electrical connection options are possible within the broad scope of the present invention.

Figure 10:
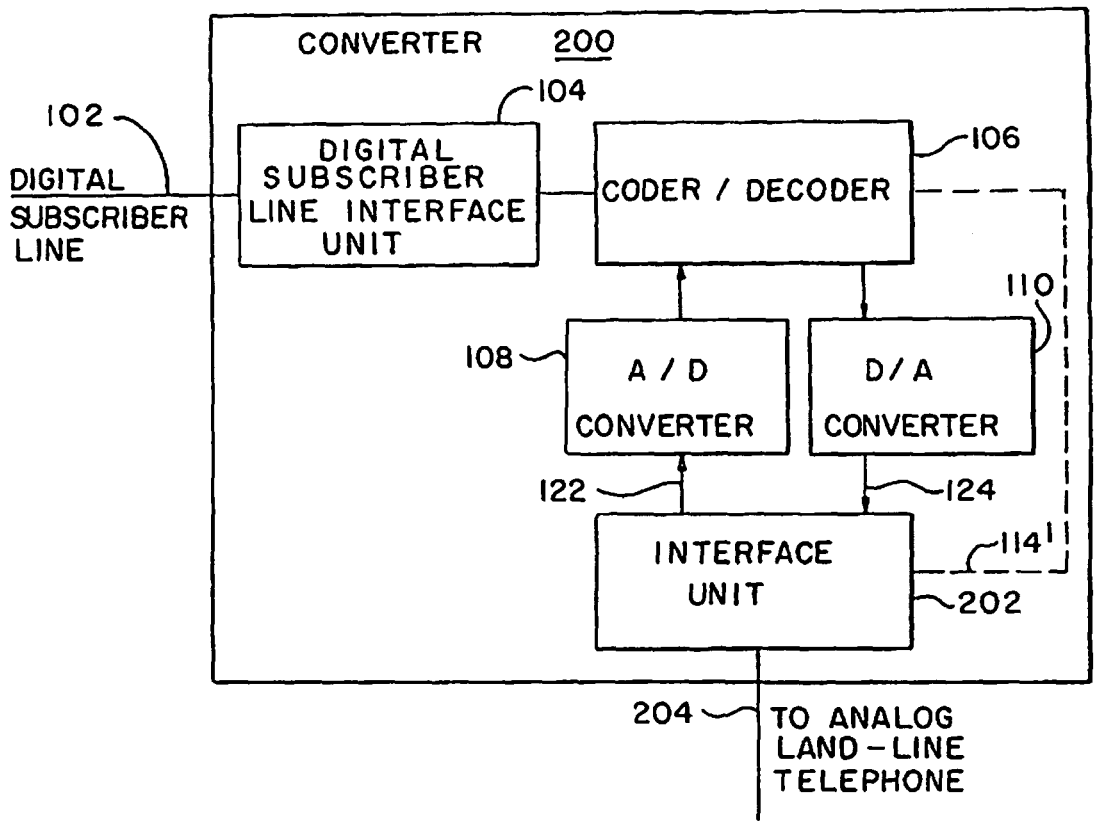
FIG. 10 presents a block diagram representation of a converter in accordance with the present invention.

FIG. 10 presents a block diagram representation of a converter in accordance with the present invention. In particular, a converter 200 is presented for use with the subscriber interface unit 180 of FIG. 9. Digital subscriber line 102 is attached to electrical coupler 188. An analog land-line telephone is coupled to the converter via line 204 connected to RJ-11 jack 190. Components that are common with subscriber unit 100 are assigned common reference numerals. Converter 200 operates in a manner similar to subscriber unit 100, however, some of the components of subscriber unit 100 are supplied by an analog land-line telephone that is attached to the unit. In other words, the functionality of user interface unit 112 is supplied by interface unit 202 in combination with the analog land-line telephone. For the purposes of this disclosure the term "subscriber unit" should include the various embodiments of subscriber unit 100 as well as the various embodiments of subscriber interface unit 180 in combination with an analog land-line telephone.

In accordance with the present invention a multi-line analog telephone can be coupled to the subscriber interface unit 180. In a manner similar to subscriber unit 100, the combination of subscriber interface unit 180 and the multi-line analog land-line telephone is capable of accessing and monitoring the plurality of telephone lines and is further capable of selecting one of the plurality of telephone lines for conducting a voice call. The converter 200 further is capable of converting a third plurality of data packets received from an additional one of the plurality of derived digital telephone lines into a third analog signal for transmission to the analog telephone.

Figure 11:
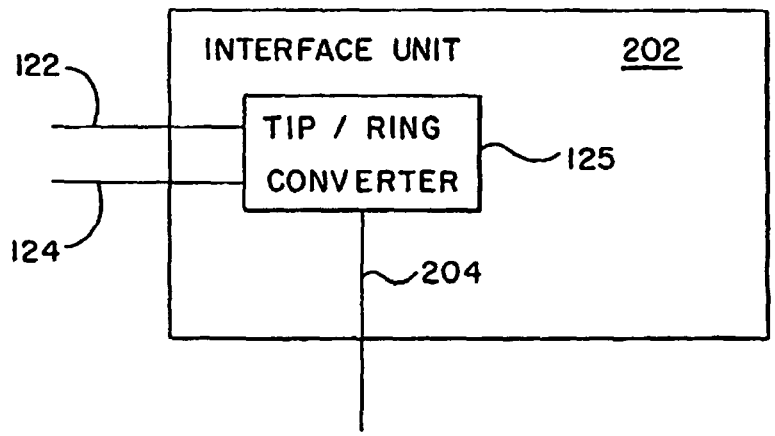
FIG. 11 presents a block diagram representation of an interface unit in accordance with the present invention.

FIG. 11 presents a block diagram representation of an interface unit in accordance with the present invention. In particular, user interface unit 202 is shown for use in accordance with one embodiment of the converter 200 of FIG. 10. Lines 122 and 124 from the A/D converter 108 and D/A converter 110 are coupled to tip/ring converter 125 as described in conjunction with several embodiments of subscriber unit 100. The output 204 appears as a standard tip and ring pair to the analog land-line telephone.

The user interface unit 202 of FIG. 11 presents minimal functionality. The inclusion of additional functions for subscriber interface unit 180 can be desirable. In particular, many of the additional functions described in conjunction with subscriber unit 100 can likewise be included in subscriber interface unit 202 in accordance with the present invention.

While the subscriber interface unit 180 of FIG. 9 does not present each of these additional functions, these functions may, nevertheless be included as described in conjunction with an alternative embodiment for interface unit 202 presented in FIG. 12.

FIG. 12 presents a block diagram representation of an interface unit in accordance with the present invention. In particular, an alternative embodiment of interface 202 designated by reference numeral 202' is presented. In this embodiment, numerous features of subscriber unit 100 are included. Components that are common with subscriber unit 100 are assigned common reference numerals. The output 204 of tip/ring converter 125 is coupled to the analog land-line telephone as well as to telephone line interface unit 120. Processor 126, display device 136, additional keys 138, call memory 142, general memory 144, smart card interface unit 146, display driver 148, keyboard 150 and data interface unit 152 function as previously described in conjunction with user interface unit 112.

FIG. 13 presents a flowchart representation of a method in accordance with the present invention. In particular, a method for initiating a call is presented for use with various embodiments of the subscriber unit 100 or the various embodiments of subscriber interface unit 180 in combination with an analog land-line telephone.

The method begins in step 300 receiving an off-hook signal, generated by the subscriber unit in response to an action of a user. In one embodiment of the present invention this signal would be generated by the switch hook of a subscriber unit responding to the handset going off-hook. In other embodiments, an off-hook signal could be generated by the user selecting an additional key of the subscriber unit such as a "handsfree" key used to initiate a call using a speakerphone function of the subscriber unit or a "send" key commonly used by cellular telephones to initiate a call.

The method continues in step 302 by initiating a first derived digital telephone line of the plurality of derived digital telephone lines in response to the off-hook signal. In particular, the off-hook signal is converted to data in a transmitted data stream that is converted to a transmitted data packet that is transmitted along the digital subscriber line to a switch through an interworking unit. This begins a data packet exchange between the switch and the subscriber unit carrying the basic telephony signals corresponding to the derived digital telephone line. In one embodiment of the present invention the data packet is addressed to an interworking unit where it is converted to a signaling protocol for interface to the switch.

FIG. 14 presents a flowchart representation of a method in accordance with the present invention. In particular, a method for initiating and terminating a call is presented for use with various embodiments of the subscriber unit 100 or the various embodiments of subscriber interface unit 180 in combination with an analog land-line telephone.

Steps 300 and 302 proceed as described in conjunction with the method described in connection with FIG. 12. The method continues in step 304 by generating a line-in-use signal, at the subscriber unit, indicating a first derived digital telephone line is in use. In step 306, a visual indicator is generated at the subscriber unit in response to the line-in-use signal. In a preferred embodiment of the present invention, the visual indicator includes a display, on display device 136, of the destination telephone number and of the duration of the call. Optionally, the visual display includes an indicator of an assigned number for the derived digital line. Thus, in a multi-line environment, a visual designator such as "line 1" can be displayed as well.

The method continues in step 308 by monitoring, at the subscriber unit, the content of at least one of the plurality of data packets of the digital subscriber line. In a preferred embodiment of the present invention, each of the incoming packets is continuously monitored by the subscriber unit to determine if any of the plurality of incoming data packets has an address corresponding to the subscriber unit. If so, the data payload from each such packet is transformed to the received data stream for transfer to the user interface unit to conduct the call. Further the transmitted data stream would be converted into a plurality of data packets addressed to the switch.

In step 310, an on-hook signal is received, generated by the subscriber unit in response to an action of a user. In one embodiment of the present invention this signal would be generated by the switch hook of a subscriber unit responding to the handset being placed on-hook. In other embodiments, an on-hook signal could be generated by the user selecting an additional key of the subscriber unit such as a "line release" key used to terminate a call using a speakerphone function of the subscriber unit.

In step 312 the derived digital telephone line is terminated in response to the on-hook signal. In particular, the call is terminated when the on-hook signal is transmitted to the switch and the subscriber unit stops creating a transmitted data stream and transmitted data packets. The exchange of data packets between the switch and the subscriber unit corresponding to the derived digital telephone line ends. In step 314, the visual display indicating the line is use is also terminated with the termination of the call.

Figure 15:
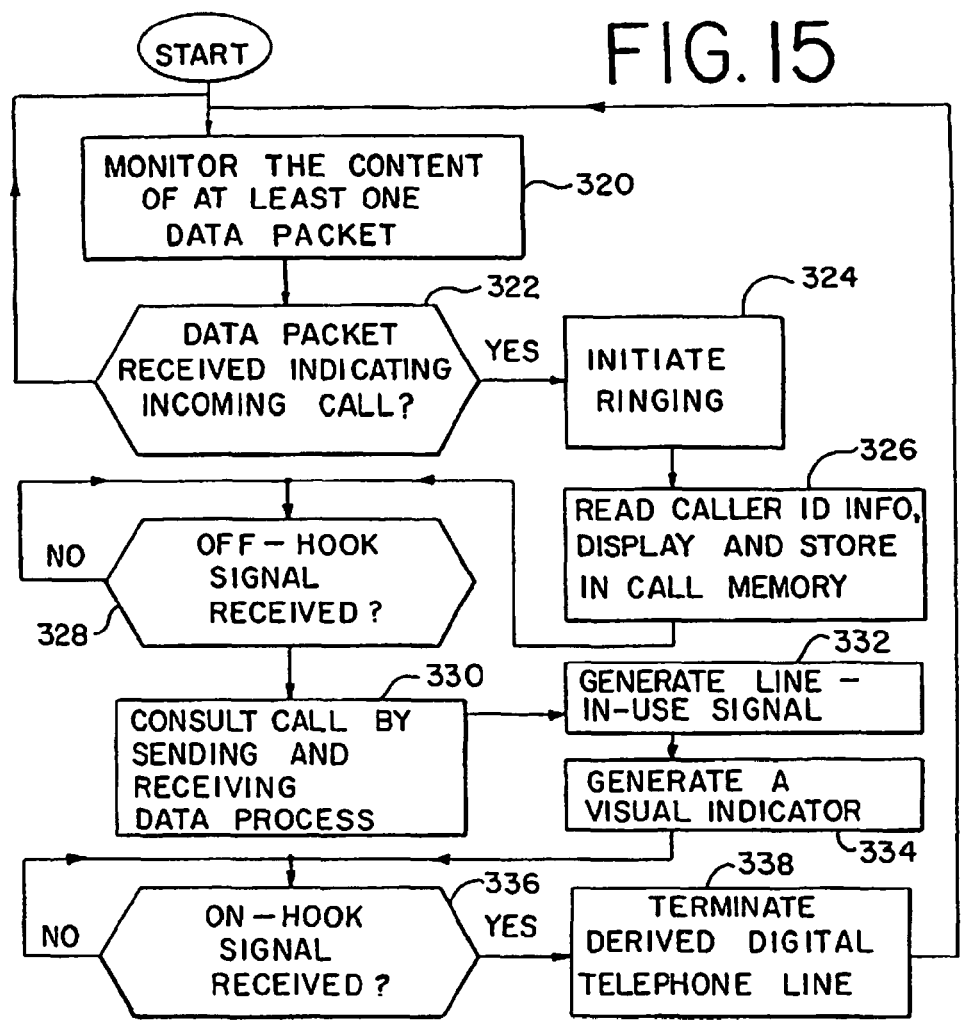
FIG. 15 presents a flowchart representation of a method in accordance with the present invention.

FIG. 15 presents a flowchart representation of a method in accordance with the present invention. In particular, a method for responding to an incoming call is presented for use with various embodiments of the subscriber unit 100 or the various embodiments of subscriber interface unit 180 in combination with an analog land-line telephone. One of ordinary skill in the art will recognize, based on the disclosure herein, that this method may be used in conjunction with the other methods of the present invention described herein.

The method begins is step 320 by monitoring the content of at least one data packet to detect an incoming call. As previously discussed, in a preferred embodiment of the present invention the step of monitoring is performed continuously. Prior to the initiation of an outgoing call or the receipt of an incoming call, the step of monitoring is important to both the detection of usage of other derived digital lines and the detection of an incoming call for the particular subscriber unit. During a call the step of monitoring is important to identifying data packets that correspond to the call in progress.

The method continues in step 322 by determining if a received packet indicates an incoming call. After receiving a data packet addressed to the particular subscriber unit, the data portion of the packet is translated to a received data stream—the data indicating a ring signal from the central office. In response, the method initiates ringing as shown in step 324. In step 326, caller ID information, that is, in a preferred embodiment, transmitted between the silent interval between the first and second ringing signals, is decoded, displayed on the display device, and is stored in a call memory.

The method proceeds in step 328 to determine if an off-hook signal is received. If an off-hook signal is received, the call is conducted in step 330 by continuously sending and receiving data packets corresponding to a derived digital telephone line between the subscriber unit and the central office for the duration of the call. In step 332, a line-in-use signal is generated in response to the off-hook signal and in step 334 a visual indicator is generated and displayed to the user. In a preferred embodiment of the present invention this visual indicator includes the duration of the call and the received caller ID data. The visual indicator may optionally include a line designator indicating the line number of the line in use.

In step 336 the method proceeds by determining if an on-hook signal is generated in response to an action of the user. In step 338, in response to the detection of an on-hook signal the derived digital line is terminated. The method continues by returning to step 320 and continuing to monitor the content of the incoming data packets for the initiation of an incoming call.

In a further embodiment of the present invention, when the remote party engaged in a telephone call on a derived digital telephone line goes on-hook, the subscriber unit generates an on-hook signal a predetermined time later to terminate the line in cases where the remote party has hung-up.

Figure 16:
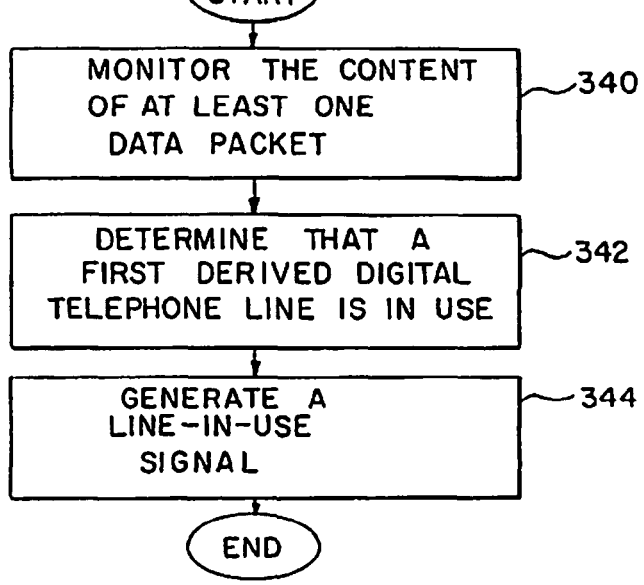
FIG. 16 presents a flowchart representation of a method in accordance with the present invention.

FIG. 16 presents a flowchart representation of a method in accordance with the present invention. In particular, a method for indicating the use of a derived digital telephone line by another subscriber unit is presented for use with various embodiments of the subscriber unit 100 or the various embodiments of subscriber interface unit 180 in combination with an analog land-line telephone. One of ordinary skill in the art will recognize, based on the disclosure herein, that this method may be used in conjunction with the other methods of the present invention described herein.

The method begins in step 340 by monitoring, at the subscriber unit, the content of at least one of the plurality of data packets corresponding to the digital subscriber line. The method continues in step 342 by determining that a first derived digital telephone line is in use based on the content of the at least one of the plurality of data packets.

In this embodiment of the present invention, the subscriber unit monitors the traffic of data packets to determine the presence of incoming and outgoing calls by other subscriber units that share the same digital subscriber line. In one such embodiment the addresses of the other subscriber units is recorded in the particular subscriber unit of interest so that packets addressed to the other subscriber units can be read. In an alternative embodiment of the present invention all incoming data packets are monitored for the presence of basic telephony signals to determine if other derived digital telephone lines are in use.

In step 344 a line-in-use signal is generated, at the subscriber unit, indicating a first derived digital telephone line is in use. This line-in-use signal can be used in the subscriber unit to display information on the status of one or more additional lines that are use by other subscriber units connected to the same digital subscriber line.

In operation, the present invention allows a plurality of subscriber units to be advantageously connected to a single subscriber line. The nature of the derived digital telephone line allows additional telephone lines to be added on demand up to the bandwidth limits of the digital subscriber loop. All of these lines can be monitored and accessed by a single subscriber unit connected to the digital subscriber line. The subscriber unit of the present invention is capable of performing the advanced features of a multi-line centrex-based system without the necessity of the additional hardware. For instance, each subscriber unit can perform three-way calling, call transfer, call forwarding, call holding etc.

Figure 17:
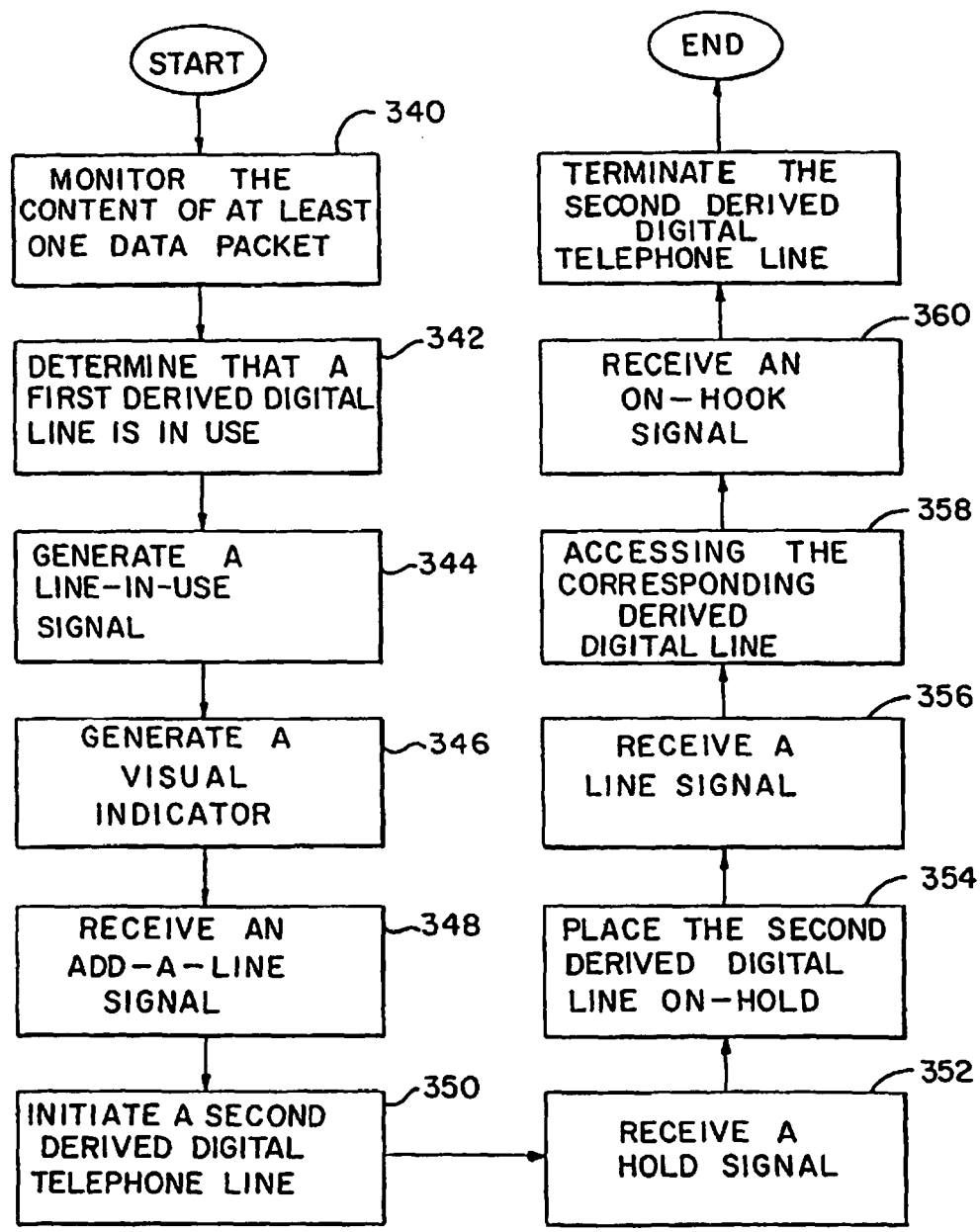
FIG. 17 presents a flowchart representation of a method in accordance with the present invention.

FIG. 17 presents a flowchart representation of a method in accordance with the present invention. In particular, a more detailed method for indicating the use of a derived digital telephone line by another subscriber unit is presented for use with various embodiments of the subscriber unit 100 or the various embodiments of subscriber interface unit 180 in combination with an analog land-line telephone. One of ordinary skill in the art will recognize, based on the disclosure herein, that this method may be used in conjunction with the other methods of the present invention described herein.

Steps 340, 342 and 344 correspond to similar steps presented in conjunction with FIG. 16. Step 346 proceeds by generating a visual indicator in response to the line-in-use signal. In a preferred embodiment of the present invention this visual indicator includes the duration of the call, the received caller ID data. The visual indicator further includes a line designator indicating the line number of the line in use.

In step 348 an add-a-line signal is received, generated in response to an action by the user. In one embodiment of the present invention, this signal is generated by an off-hook signal where a line is currently in use. In this fashion the subscriber unit defaults to adding a new line rather than adding the user to a call on an existing line when the receiver is picked-up during a period when another derived digital telephone line is in use. In this embodiment, an existing call would be accessed by a user by pressing another key, such as a soft key, adjacent to the portion of display indicating that an call is progress. In an alternative embodiment the functions could be reversed and an off-hook signal would default to joining an existing call and an additional key could be used to generate an add-a-line signal.

The method proceeds in step 350 by initiating a second derived digital line by setting up two-way packet data communication with the local central office. Optional steps 352 and 354 correspond to receiving a hold signal generated by the action of the user, such a pressing a hold button, and placing the second derived digital line on "hold". Optional steps 356 and 358 correspond to receiving a signal based on the action of a user indicating one of a plurality of derived digital lines that are currently active and accessing the corresponding one of the plurality of derived digital lines.

In step 360 an on-hook signal is received and in step 362, the second derived digital line is terminated in response to the on-hook signal. These steps are similar in scope to steps described in conjunction with the methods of FIGS. 14 and 15.

Figure 18:
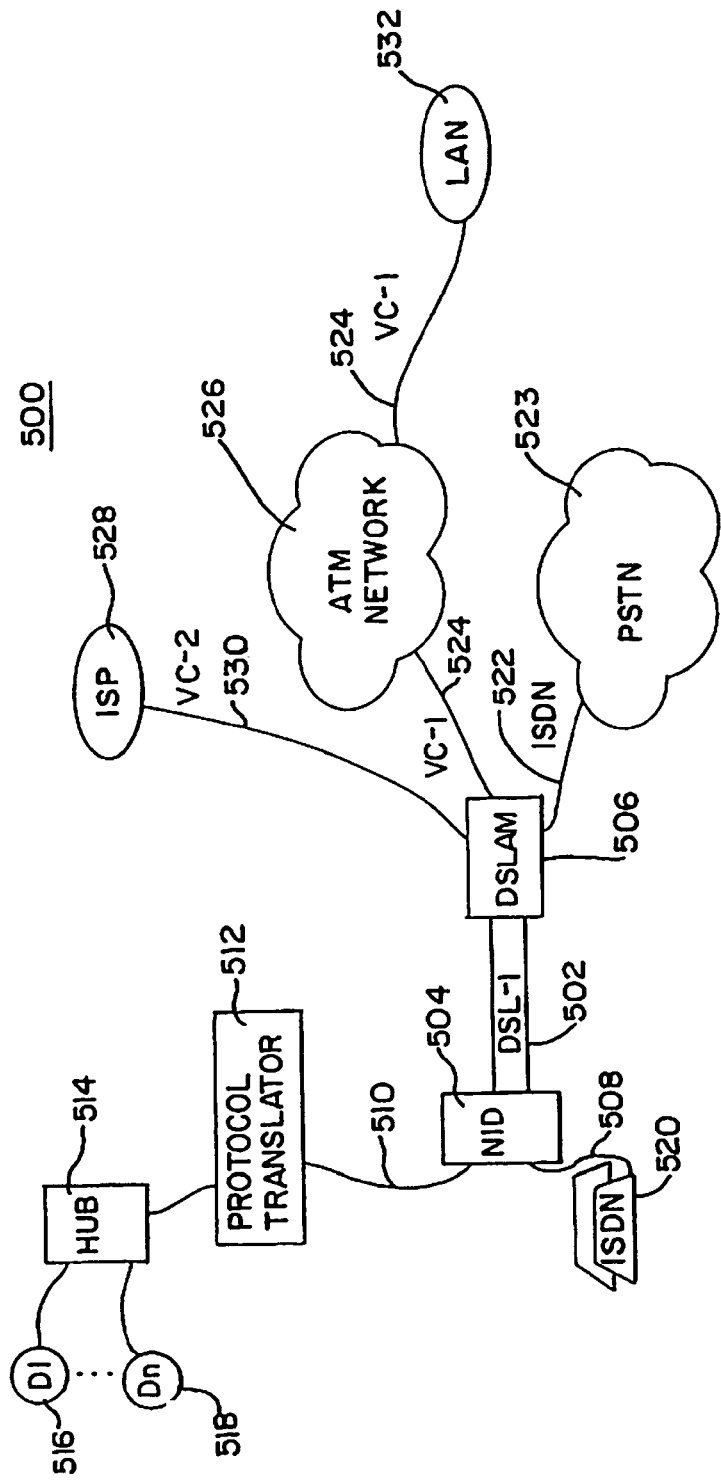
FIG. 18 presents a block diagram of a wide area communication network in accordance with the present invention.

FIG. 18 presents a block diagram of a wide area communication network 500 in accordance with the present invention. The network 500 has a first digital subscriber line 502 connected between a first network interface device (NID) 504 and digital subscriber line access multiplexer (DSLAM) 506. The NID 504 separates an ISDN (Integrated Services Digital Network) channel 508 from a digital subscriber channel 510. A protocol translator 512 is connected the a digital subscriber channel 510. The protocol translator converts between the ATM format of the DSL channel 510 and a local area network format, such as Ethernet (CDCS—Collision Sense Collision Detect). A hub 514 is connected to the protocol translator and a plurality of devices 516, 518. The hub 514 connects the plurality of devices together and may act as a repeater. An ISDN telephone 520 is connected to the ISDN channel 508.

The DSLAM 506 separates the digital subscriber channel from the ISDN channel 522. The ISDN channel 522 is connected to the PSTN (Public Switched Telephone Network) 523. The digital subscriber channel includes a first virtual circuit 524 connected to an asynchronous transfer mode network 526. An ISP (Internet Service Provider) 528 is connected to a second virtual circuit 530 of the digital subscriber channel. A local area network 532 is connected by the first virtual circuit 524 to the ATM network 526. Technically, the first virtual circuit 524 would extend from the protocol translator 512 to the LAN 532.

DSL lines are a service that runs over ordinary twisted pair (copper) wires. The DSL is connected between a central office of a telephone company to a subscriber location. DSL uses the ATM (Asynchronous Transfer Mode) protocol to transport the data over the telephone wires. ATM is a connection oriented service. Before any data is transmitted a virtual circuit must be defined between the end points. In the case of prior art DSL services, a permanent virtual circuit is defined between the subscriber and an ISP. However, ATM specifies both permanent virtual circuits and switched virtual circuits. A switched virtual circuit is set up at the beginning of a session and torn down when the session is over, similar to a telephone call. A virtual circuit is defined by a virtual path identifier (VPI) and a virtual circuit identifier (VCI). These identifiers are included in the header of every ATM cell (packet). An ATM switch examines the VPI and VCI to determine how to switch the cell. Since the virtual circuit (path) has been defined before any data is sent, the ATM switch only need examine a small portion of the identifiers. This allows the ATM switch to switch the cell on the fly, as opposed to the store and forward approach of routers. This makes ATM more secure and faster than router systems such as the Internet. Note that the same physical medium and the same bandwidth can and commonly are used for more than a single virtual circuit. Thus in FIG. 18 the first virtual circuit 524; the second virtual circuit 530 and the ISDN channel 508 are all carried over the single DSL line 502.

Figure 19:
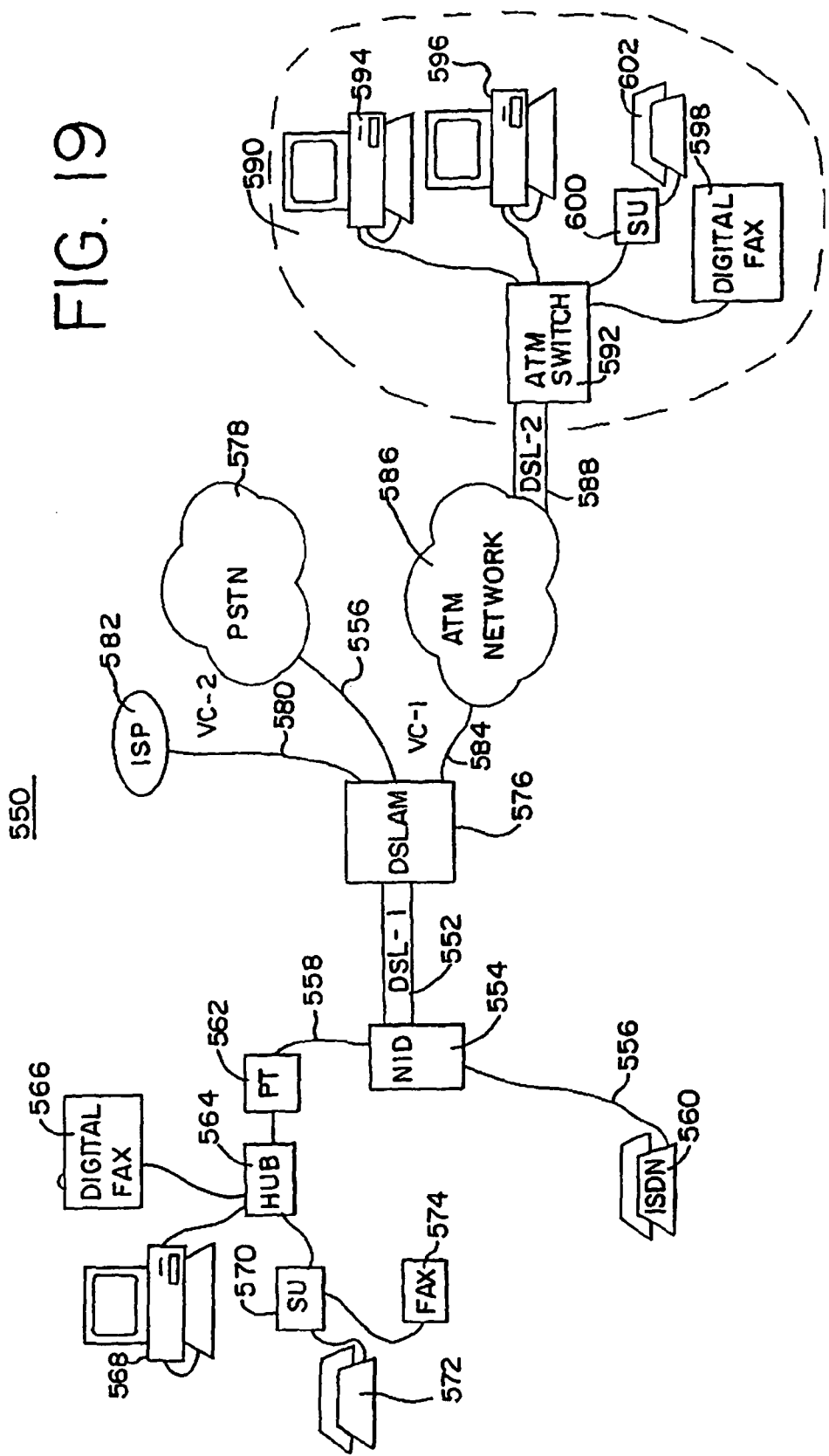
FIG. 19 presents a block diagram of a wide area communication network in accordance with the present invention.

FIG. 19 presents a block diagram of a wide area communication network 550 in accordance with the present invention. The network includes a first DSL 552 connected to a first NID 554. The NID splits the ISDN channel (POTS channel) 556 from the digital subscriber channel 558. An ISDN telephone 560 is connected to the ISDN channel 556. In another embodiment two ISDN telephones are connected to the ISDN channel 556. The ISDN channel 556 is a BRI (basic rate interface) ISDN channel and has two B-channels and one D-channel. The two B-channels allow two simultaneous telephone calls. The D-channel is used for control information, such as call setup. The B-channels can also be used for carrying data.

A protocol translator 562 is connected to the first NID 554. A hub 564 is connected to the protocol translator 562. The hub 564 connects together a local area network. The local area network can include a variety of electronic devices. For instance, a digital facsimile machine 566 is connected to the hub 564. A digital facsimile machine 566 as used herein means a facsimile machine that is capable of sending and receiving facsimile information (digitized facsimile transmission) using a digital data standard as opposed to a facsimile machine that transmits and receives facsimile data (digitized facsimile transmission) over a POTS telephone line. A computer 568 is connected to the hub 564. A subscriber unit 570 is connected to the hub 564. A POTS telephone 572 and a POTS facsimile machine (facsimile machine) 574 are connected to the subscriber unit 570. The subscriber unit 570 converts between the LAN format data and POTS signals.

A DSLAM 576 is connected to the DSL 552. The ISDN channel 556 connects the DSLAM 576 to the PSTN (Public Switched Telephone Network) 578. A second virtual circuit 580 of the digital subscriber channel is connected between an ISP 582 and the DSLAM 576. A first virtual circuit 584 of the digital subscriber channel extends through the DSLAM 576, ATM network 586 to a second DSL 588. The second DSL 588 connects to a second local area network 590. The second local area network includes an ATM switch 592. A plurality of computers 594, 596, a digital facsimile machine (network facsimile machine) 598 and a second subscriber unit 600 are connected to the ATM switch 592. A POTS telephone 602 is connected to the subscriber unit 600. In one embodiment the subscriber unit and telephone are combined to form a network telephone.

Figure 20:
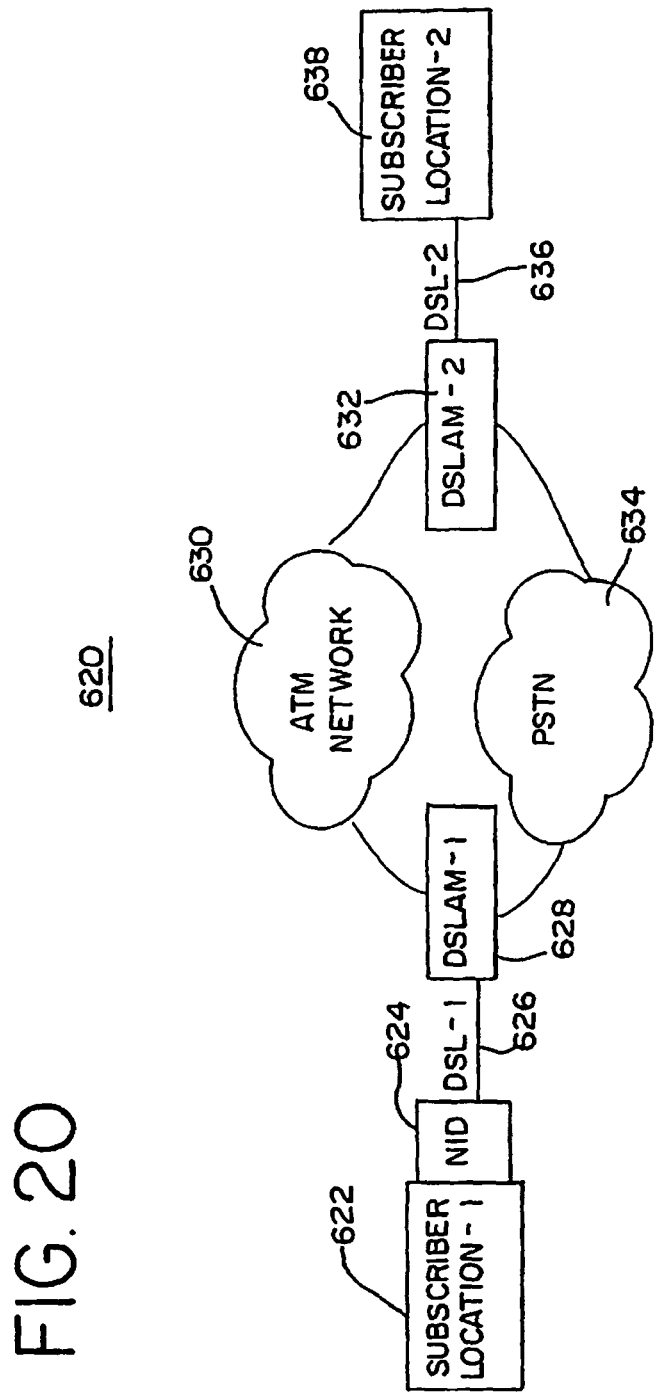
FIG. 20 presents a block diagram of a wide area communication network in accordance with the present invention.

FIG. 20 presents a block diagram of a wide area communication network 620 in accordance with the present invention. The network 620 has a first subscriber location 622. A first network interface device (NID) 624 is attached to the first subscriber location 622. A first digital subscriber line 626 connects the NID 624 to a first digital subscriber line access multiplexer (DSLAM) 628. The DSLAM 628 is coupled to an ATM network 630. A second digital subscriber line access multiplexer (DSLAM) 632 is connected to the ATM network 630. A public switched telephone network (PSTN) 634 connects the first DSLAM 628 to the second DSLAM 632. A second digital subscriber line 636 connects the second DSLAM 632 to a second subscriber location 638. In one embodiment the second subscriber location 638 is attached to a second NID.

Figure 21:
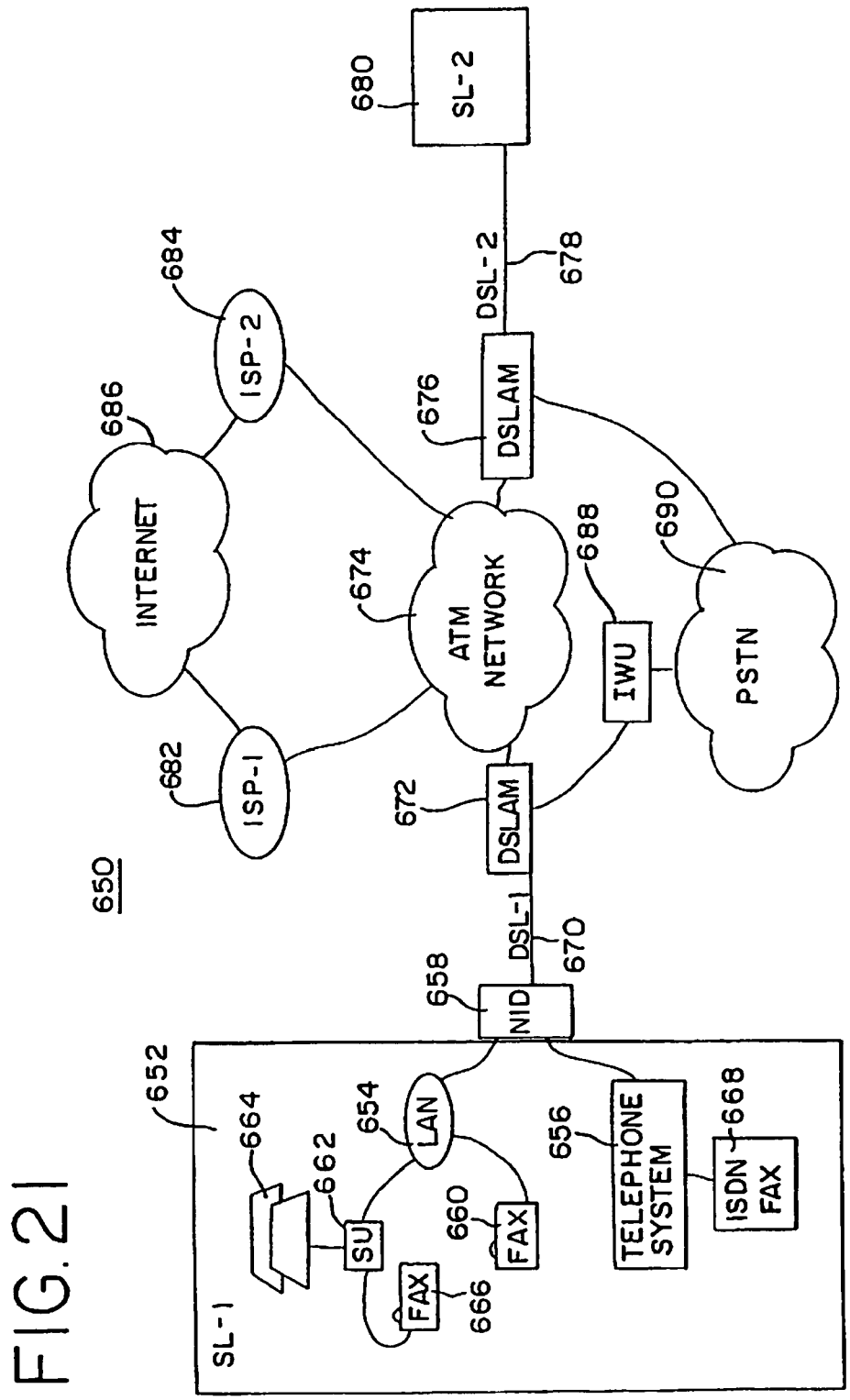
FIG. 21 presents a block diagram of a wide area communication network in accordance with the present invention.

FIG. 21 presents a block diagram of a wide area communication network 650 in accordance with the present invention. A first subscriber location 652 includes a first LAN 654 and a first telephone system 656 connected to a NID 658. The LAN 654 includes a network facsimile machine 660 and a subscriber unit 662. A POTS telephone 664 and POTS facsimile machine 666 are connected to the subscriber unit 662. The subscriber unit converts between an analog telephone signal and a digital telephone signal. An ISDN facsimile machine 668 is connected to the telephone system 656. An ISDN facsimile machine is a facsimile machine that is capable of communicating facsimile information over an ISDN line.

A first DSL 670 connects the NID 658 to a first DSLAM 672. An ATM network 674 is connected to the DSLAM 672. A second DSLAM 676 is connected to the ATM network 674. A second digital subscriber line 678 connects a second subscriber location 680 to the second DSLAM 676. A first ISP 682 and a second ISP 684 are connected to the ATM network 674. The internet 686 connects the first ISP 682 and the second ISP 684. An interworking unit (IWU) 688 is connected to the DSLAM 672. The IWU converts between a packet data format and a circuit switch data format. A PSTN 690 connects the IWU to the DSLAM 676. In one embodiment the telephone signal from the telephone 664 is carried by a telephone virtual circuit. In another embodiment the telephone virtual circuit terminates at the ISP 682. In this embodiment the telephone signal is carried by the internet for a portion of the call. In another embodiment, the telephone circuit terminates at the interworking unit. The call is then routed as a standard circuit switched call. In one embodiment a digitized facsimile transmission from (to) the digital facsimile machine 660 is carried by a facsimile virtual circuit. In one embodiment, the telephone system receives a POTS signal from the NID 658. In this case the telephone or facsimile machine connected to the telephone system must be a POTS device.

This system allows a small business to setup a communication network over a digital subscriber line. The communication network includes computer data, voice signals and facsimile signals.

Figure 22:
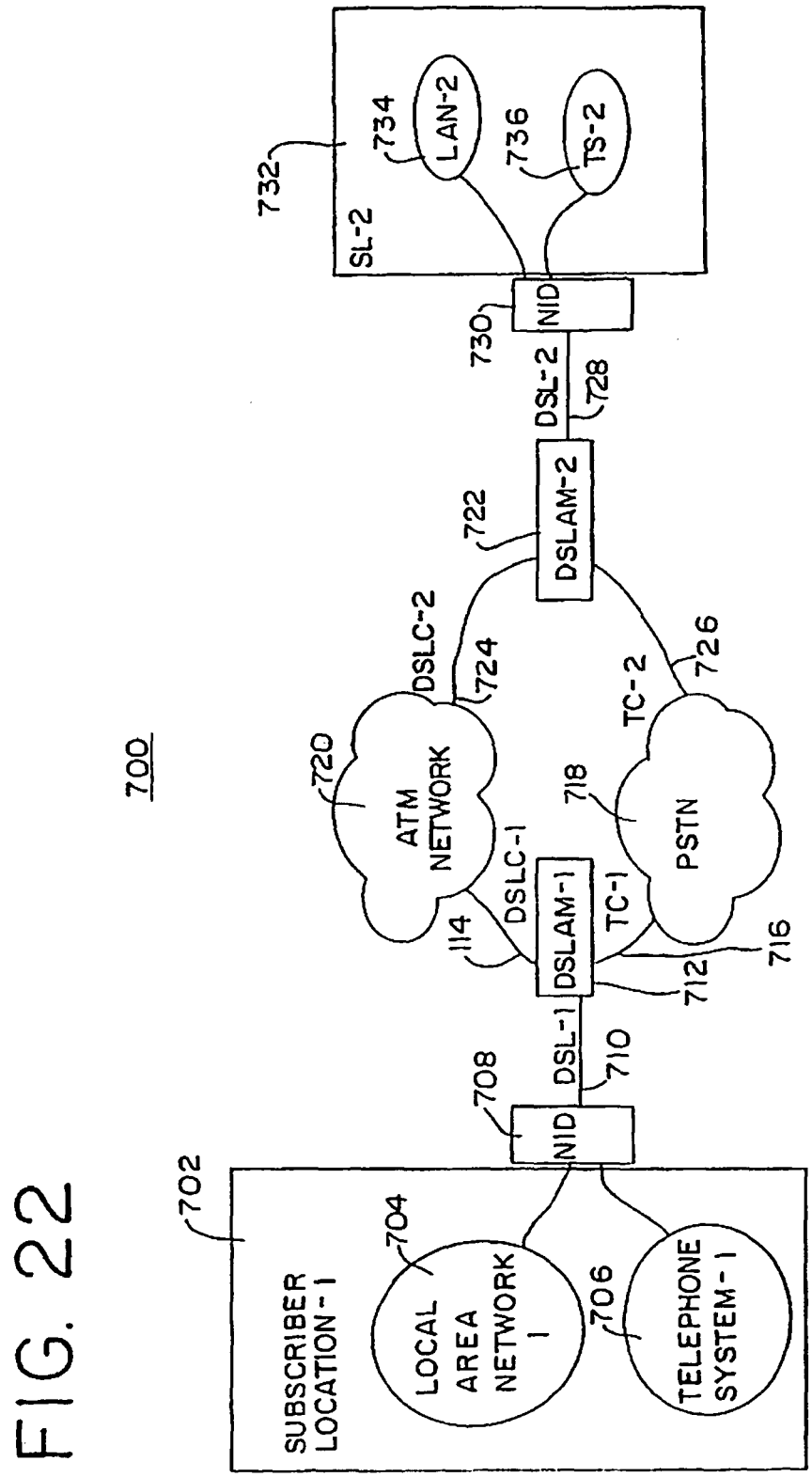
FIG. 22 presents a block diagram of a wide area communication network in accordance with the present invention.

FIG. 22 presents a block diagram of a wide area communication network 700 in accordance with the present invention. A first subscriber location 702 includes a first local area network 704 and a first telephone system 706. The first LAN 704 and telephone system 706 are connected to a first NID 708. A first DSL line 710 is connected to the NID 708. A first DSLAM 712 is connected to the first DSL line 710. The DSLAM 712 separates the a first DSL channel 714 from a first telephony channel 716. A public switched telephone network 718 is connected to the first telephony channel 716. An ATM network 720 is connected to the first DSL channel 714. A second DSLAM 722 is connected to the ATM network by a second DSL channel 724. The second DSLAM 722 is connected to the PSTN 718 by a second telephony channel 726. A second DSL line 728 is connected to the second DSLAM 722. A second NID 730 attached to a second subscriber location 732 is connected to the second DSL line 728. A second local area network 734 and a second telephone system 736 are connected to the second NID 730.

Figure 23:
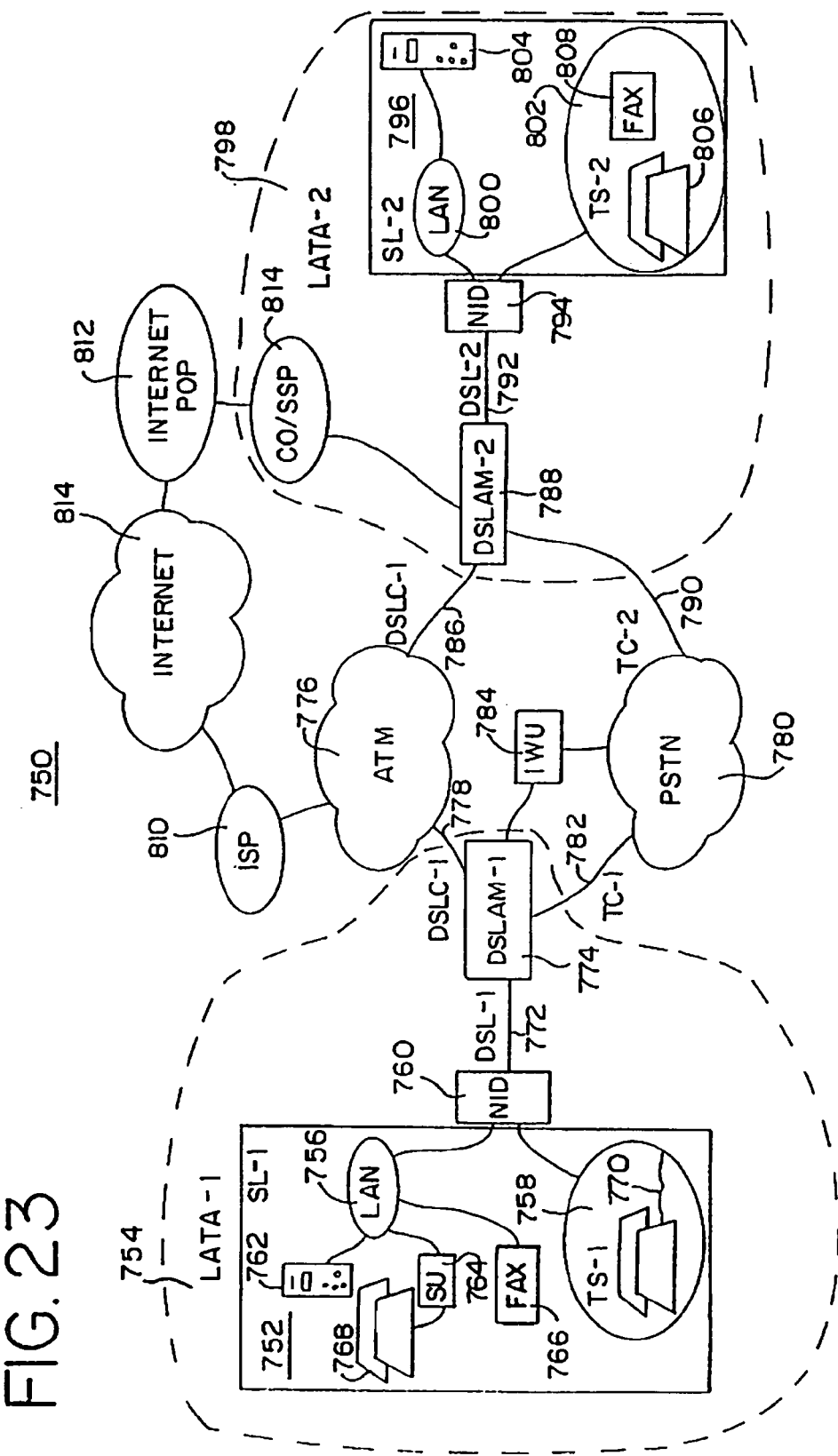
FIG. 23 presents a block diagram of a wide area communication network in accordance with the present invention.

FIG. 23 presents a block diagram of a wide area communication network 750 in accordance with the present invention. A first subscriber location 752 in a first local access and transport area (LATA) 754 includes a first LAN 756 and a first telephone system (TS-1) 758. Note the telephone system can consist of a single POTS line or a single BRI ISDN line and the telephone (or computer) equipment that can be connected to the line. The first LAN 756 and first telephone system 758 are connected to a first NID 760. The first LAN 756 includes a first computer 762, a subscriber unit 764 and a network facsimile machine 766. A telephone 768 is connected to the subscriber unit 764. A telephone 770 is part of the first telephone system 758. A first DSL line 772 connects a first DSLAM 774 to the NID 760. The DSLAM 774 is connected to an ATM network 776 by a first DSL channel 778. A PSTN 780 is connected to the DSLAM 774 by a first telephony channel 782 and by an IWU 784. A second DSL channel 786 connects the ATM network 776 to a second DSLAM 788. A second telephony channel 790 connects the PSTN 780 to the DSLAM 788. A second DSL line 792 connects a DSLAM 788 to a second NID 794. The NID 794 is attached to the second subscriber location 796 in a second local access and transport area (LATA) 798. The second subscriber location includes a second LAN 800 and a second telephone system 802 connected to the NID 794. A second computer 804 is connected to the LAN 800. A second telephone 806 and a facsimile machine 808 are part of the second telephony system 802.

A first ISP 810 is connected to the ATM network 776. The ISP 810 is connected to an internet POP (point of presence) 812 by the internet 814. The internet POP 812 connects to the second DSL line 792 via an central office—service switching point (CO/SSP) 814. In one embodiment a first virtual circuit couples the first computer 762 to a second computer 804. The first virtual circuit is carried by the first DSL line 772, the ATM network 776 and the second DSL line 792. In another embodiment, a first switched circuit connects the first telephone 770 to a second telephone 806. The first switched circuit connects across the first DSL line 772, the PSTN 780 and the second DSL line 792. In another embodiment, a network telephone 768 is connected to the second telephony system 802 by a first hybrid circuit. The first hybrid circuit includes a second virtual circuit connecting the first LAN 756 to the IWU 784. A second switched circuit connects the IWU 784 to the second DSL line 792 through the PSTN 780. The second telephony channel 790 connects to the second telephone 806. In another embodiment the first hybrid circuit includes a second virtual circuit connecting the first LAN 756 to the DSLAM 774, to the ATM network 776 and to the ISP 810. An internet telephony circuit connects the ISP 810 through the internet 814 to the internet POP 812. A second switched circuit connects the internet POP 812 to the second DSL 792. The second telephony channel connects the DSL 792 to the second telephone 806. Note that the term "internet circuit" is used to describe the routing of the call data through the internet. In another embodiment a second hybrid circuit connects the digital facsimile machine 766 to the facsimile machine 808. The second hybrid circuit includes a third virtual circuit connecting a first LAN 756 to the DSLAM 774 and then to the IWU 784. A third switched circuit connects the IWU 784 to the second DSL line 792 through the PSTN 780. The second telephony channel connects the DSL 792 to the facsimile machine 808.

The network described above allows small business to setup wide area communication networks that can transmit a variety of types of data. The data types include computer data, voice signals, facsimile signals and video signals. As will be apparent to those skilled, in light of the foregoing description, almost any type of data (signal) can be sent over the wide area network. The communication network takes advantage of DSL services that provide access to both packet (cell) switched or routed networks and circuit switched networks. In addition, the wide area network is easily reconfigurable as the business moves and expands.

The various methods described herein, in a preferred embodiment, are intended for operation as software programs running on a computer processor. One of ordinary skill in the art will recognize that other hardware implementations such as bridges and routers could be used. It should also be noted that the various methods of the present invention could be stored on a tangible storage medium such as a magnetic or optical disk, read-only memory or random access memory and be produced as an article of manufacture.

Thus, there has been described herein a concept, as well as several embodiments including a preferred embodiment, of a wide area communication network. The various embodiments of methods and systems, by enabling a wide area communication network over digital subscriber lines, provide a significant improvement over the prior art. Additionally, the various embodiments of the present invention herein-described have other features that distinguish the present invention from the prior art.

The invention claimed is:

1. A communications network comprising:
    a broadband communication line comprising:
        a first derived voice channel; and
        a second derived voice channel;
        wherein the first and second derived voice channels are established as a function of an available bandwidth associated with the broadband communication line; and
    a gateway in communication with the broadband communication line, the gateway comprising:
        a switch;
        wherein the switch is configured to select at least one of the first or second derived voice channels for voice communication over the broadband communication line as a function of the available bandwidth.

2. The network of claim 1 further comprising an ATM (asynchronous transfer mode) network, the ATM network in communication with the gateway via the network interface device.

3. The network of claim 2 further comprising a telephony network, the telephony network in communication with the gateway via the network interface device.

4. The network of claim 1, wherein the gateway is configured to communicate with a local area network via the broadband communication line.

5. The network of claim 1, wherein the broadband communication line is configured to carry at least one digital voice communication and at least one digital data communication.

6. The network of claim 1 further comprising:
a network interface device configured for communications with the broadband communication line via a broadband cable connection.

7. The network of claim 1 further comprising:
a network interface device configured for communications with the broadband communication line via a broadband digital subscriber line connection.

8. The network of claim 1 further comprising:
a network interface device configured to receive a video signal from a television service provider selected from the group consisting of: a cable provider and a satellite provider.

9. A communications network comprising:
a broadband communication service provided by a cable connection, the broadband communication service comprising:
a plurality of derived voice channels;
wherein the plurality of derived voice channels are provided based on an available bandwidth associated with the broadband communication service; and
a gateway comprising:
a router;
wherein the router is configured to select at least one of the plurality of derived voice channels for voice communication over the cable connection as a function of the available bandwidth.

10. The network of claim 9 further comprising an (asynchronous transfer mode) ATM network, the ATM network in communication with the gateway via the network interface device.

11. The network of claim 10 further comprising a telephony network, the telephony network in communication with the gateway via the network interface device.

12. The network of claim 9, wherein the gateway is configured to communicate with a local area network via the router.

13. The network of claim 9, wherein the cable connection is configured to carry at least one digital voice communication and at least one digital data communication.

14. The network of claim 9, wherein the cable connection is provided via a broadband digital subscriber line connection.

15. The network of claim 9 further comprising:
a network interface device configured to receive a video signal from the cable connection.

16. A system comprising:
a subscriber unit, coupleable to a broadband communication line, the subscriber unit for establishing a first derived voice channel and a second derived voice channel as a function of an available bandwidth associated with the broadband communication line; and
a gateway in communication with the broadband communication line, the gateway comprising:
a switch;
wherein the switch is configured to select at least one of the first or second derived voice channels for voice communication over the broadband communication line as a function of the available bandwidth.

17. The system of claim 16, wherein the gateway is configured to communicate with a local area network via the broadband communication line.

18. The system of claim 16, wherein the broadband communication line is configured to carry at least one digital voice communication and at least one digital data communication.

* * * * *